(12) United States Patent
Lee et al.

(10) Patent No.: US 12,071,566 B2
(45) Date of Patent: Aug. 27, 2024

(54) ANTIMONY-FREE RADIATION CURABLE COMPOSITIONS FOR ADDITIVE FABRICATION, AND APPLICATIONS THEREOF IN INVESTMENT CASTING PROCESSES

(71) Applicant: Stratasys, Inc., Eden Prairie, MN (US)

(72) Inventors: Tai Yeon Lee, Elgin, IL (US); Mike Scianna, Elgin, IL (US); Paulus Steeman, Echt (NL); Marco Driessen, Echt (NL); Johan Jansen, Echt (NL); Sainath Vaidya, Echt (NL)

(73) Assignee: STRATASYS INC., Eden Prairie, MN (US)

( * ) Notice: Subject to any disclaimer, the term of this patent is extended or adjusted under 35 U.S.C. 154(b) by 0 days.

(21) Appl. No.: 17/694,786

(22) Filed: Mar. 15, 2022

(65) Prior Publication Data

US 2022/0228010 A1 Jul. 21, 2022

Related U.S. Application Data

(62) Division of application No. 15/774,034, filed as application No. PCT/US2016/062440 on Nov. 17, 2016, now Pat. No. 11,332,625.

(60) Provisional application No. 62/256,389, filed on Nov. 17, 2015.

(51) Int. Cl.
| | |
|---|---|
| C08F 2/46 | (2006.01) |
| B22C 9/04 | (2006.01) |
| B29C 64/124 | (2017.01) |
| B33Y 10/00 | (2015.01) |
| B33Y 70/00 | (2020.01) |
| C08F 2/50 | (2006.01) |
| C08G 59/22 | (2006.01) |
| C08G 59/24 | (2006.01) |
| C08G 59/68 | (2006.01) |
| C08G 61/04 | (2006.01) |
| C08G 65/18 | (2006.01) |
| C09D 7/63 | (2018.01) |
| C09D 163/00 | (2006.01) |
| B29K 105/00 | (2006.01) |

(52) U.S. Cl.
CPC .............. C09D 7/63 (2018.01); B22C 9/043 (2013.01); B29C 64/124 (2017.08); B33Y 10/00 (2014.12); B33Y 70/00 (2014.12); C08F 2/50 (2013.01); C08G 59/22 (2013.01); C08G 59/24 (2013.01); C08G 59/245 (2013.01); C08G 59/687 (2013.01); C08G 65/18 (2013.01); C09D 163/00 (2013.01); B29K 2105/0005 (2013.01)

(58) Field of Classification Search
CPC ...... C09D 163/00; C09D 7/63; C08G 59/245; C08G 59/687; C08G 59/24; C08G 65/18; B29C 64/124; B29K 2105/0005; B22C 9/043; B33Y 70/00; B33Y 10/00; C08F 2/50

USPC ........... 522/45, 33, 6, 71, 1, 189, 184; 520/1
See application file for complete search history.

(56) References Cited

U.S. PATENT DOCUMENTS

| | | |
|---|---|---|
| 6,165,386 A | 12/2000 | Endo et al. |
| 6,368,769 B1 | 4/2002 | Ohkawa et al. |
| 7,696,260 B2 | 4/2010 | Ren et al. |
| 8,334,025 B2 | 12/2012 | Fong et al. |
| 8,367,204 B2 | 2/2013 | Uchida et al. |
| 8,871,133 B2 | 10/2014 | Lawton et al. |
| 9,228,073 B2 | 1/2016 | He et al. |
| 9,951,198 B2 * | 4/2018 | He ......................... G03F 7/0047 |
| 2002/0127400 A1 | 9/2002 | Uchida |
| 2007/0228614 A1 | 10/2007 | Ren |
| 2009/0197987 A1 | 8/2009 | Hayoz |
| 2010/0015408 A1 | 1/2010 | Fong et al. |
| 2010/0119835 A1 | 5/2010 | Messe et al. |
| 2011/0300482 A1 | 12/2011 | Suzuki et al. |
| 2012/0251829 A1 * | 10/2012 | Xu .......................... G03F 7/038 |
| | | 264/496 |
| 2012/0251841 A1 | 10/2012 | Southwell et al. |
| 2012/0259031 A1 * | 10/2012 | Dake ....................... G03F 7/029 |
| | | 522/27 |
| 2012/0295077 A1 | 11/2012 | Ficek et al. |
| 2014/0235747 A1 * | 8/2014 | Rundlett ................. G03F 7/002 |
| | | 522/170 |

FOREIGN PATENT DOCUMENTS

| | | |
|---|---|---|
| EP | 2399905 B1 | 1/2014 |
| EP | 2137576 B1 | 8/2018 |
| JP | 2013514213 A | 4/2013 |
| JP | 2013514451 A | 4/2013 |
| WO | 0064831 A1 | 11/2000 |
| WO | 2007048819 A1 | 5/2007 |
| WO | 2010095385 A1 | 8/2010 |

(Continued)

OTHER PUBLICATIONS

National Center for Biotechonogy Information, Substance Record for SID 235245554, Pub Chem Substance Database, http://pubchem.ncbi.nlm.nih.gov/substance/235245554.

(Continued)

*Primary Examiner* — Jessica Whiteley
(74) *Attorney, Agent, or Firm* — Faegre Drinker Biddle & Reath LLP

(57) ABSTRACT

Radiation curable compositions for additive fabrication are described and claimed. Such compositions are particularly suited for investment casting applications, and include a cationically polymerizable component, a radically polymerizable component, a certain type of prescribed antimony-free, sulfonium salt-based cationic photoinitiator, and a free-radical photoinitiator. In other embodiments, the composition may also include a photosensitizer and/or a UV/absorber. Also described and claimed is a method for using a liquid radiation curable resin for additive fabrication with a certain type of prescribed antimony-free, sulfonium salt-based cationic photoinitiator and a certain type of prescribed photosensitizer in an investment casting process.

19 Claims, 4 Drawing Sheets

(56) References Cited

FOREIGN PATENT DOCUMENTS

| WO | 2011075553 A1 | 6/2011 |
| WO | 2011075555 | 6/2011 |
| WO | 2011091228 A1 | 7/2011 |
| WO | 2015148613 A1 | 10/2015 |

OTHER PUBLICATIONS

International Search Report for PCT/US2016/062440 dated Mar. 22, 2017.
Partial Supplementary European Search Report for Application EP 16867103 dated Jun. 5, 2019.
Hoyoung Lee et al., CO2-producing polymer micelles, Polymer Degradation and Stability, 2015 pp. 149-157, 120.
W.Arthur Green et al., Industrial Photoinitiators—A Technical Guide, Chapter Seven: Cationic Chemistry, May 5, 2014, International Standard Book No. 1-3-978-1-439R-2746(ebook-PDF).

* cited by examiner

ANTIMONY-FREE RADIATION CURABLE COMPOSITIONS FOR ADDITIVE FABRICATION, AND APPLICATIONS THEREOF IN INVESTMENT CASTING PROCESSES

CROSS-REFERENCE TO RELATED APPLICATIONS

This application claims the benefit of U.S. application Ser. No. 15/774,034, filed 7 May 2018, which is a national stage application under 35 U.S.C. § 371 of PCT/US16/62440, filed 17 Nov. 2016, which claims priority to U.S. Provisional Application No. 62/256,389, filed 17 Nov. 2015, each of which is hereby incorporated by reference in their entireties as if fully set forth herein.

TECHNICAL FIELD

The present invention relates to improved antimony-free liquid radiation curable compositions for additive fabrication, and their application in investment casting processes.

BACKGROUND

Additive fabrication processes for producing three dimensional objects are well known. Additive fabrication processes utilize computer-aided design (CAD) data of an object to build three-dimensional parts. These three-dimensional parts may be formed from liquid resins, powders, or other materials.

A non-limiting example of an additive fabrication process is stereolithography (SL). Stereolithography is a well-known process for rapidly producing models, prototypes, patterns, and production parts in certain applications. SL uses CAD data of an object wherein the data is transformed into thin cross-sections of a three-dimensional object. The data is loaded into a computer which controls a laser that traces a pattern of a cross section through a liquid radiation curable resin composition contained in a vat, solidifying a thin layer of the resin corresponding to the cross section. The solidified layer is recoated with resin and the laser traces another cross section to harden another layer of resin on top of the previous layer. The process is repeated layer by layer until the three-dimensional object is completed. When initially formed, the three-dimensional object is, in general, not fully cured, and is called a "green model." Although not required, the green model may be subjected to post-curing to enhance the mechanical properties of the finished part. An example of an SL process is described in U.S. Pat. No. 4,575,330.

There are several types of lasers used in stereolithography, traditionally ranging from 193 nm to 355 nm in wavelength, although other wavelength variants exist. The use of gas lasers to cure liquid radiation curable resin compositions is well known. The delivery of laser energy in a stereolithography system can be Continuous Wave (CW) or Q-switched pulses. CW lasers provide continuous laser energy and can be used in a high speed scanning process. However, their output power is limited which reduces the amount of curing that occurs during object creation. As a result the finished object will need additional post process curing. In addition, excess heat could be generated at the point of irradiation which may be detrimental to the resin. Further, the use of a laser requires scanning point by point on the resin which can be time-consuming.

Other methods of additive fabrication utilize lamps or light emitting diodes (LEDs). LEDs are semiconductor devices which utilize the phenomenon of electroluminescence to generate light. At present, LED UV light sources currently emit light at wavelengths between 300 and 475 nm, with 365 nm, 390 nm, 395 nm, 405 nm, and 415 nm being common peak spectral outputs. See textbook, "Light-Emitting Diodes" by E. Fred Schubert, $2^{nd}$ Edition, © E. Fred Schubert 2006, published by Cambridge University Press, for a more in-depth discussion of LED UV light sources.

Many additive fabrication applications require a freshly-cured part, aka the "green model" to possess high mechanical strength (modulus of elasticity, fracture strength). This property, often referred to as "green strength," constitutes an important property of the green model and is determined essentially by the nature of the liquid radiation curable resin composition employed in combination with the type of apparatus used and degree of exposure provided during part fabrication. Other important properties of a stereolithographic resin composition include a high sensitivity for the radiation employed in the course of curing and a minimum amount of curl or shrinkage deformation, permitting high shape definition of the green model. Of course, not only the green model but also the final cured article should have sufficiently optimized mechanical properties.

Components made via additive fabrication are used in a wide multitude of applications and industries. Depending on the application used, different properties in the liquid radiation curable composition may become more or less critical. One such application in the investment casting industry poses several unique challenges.

First, when utilized for investment casting operations, such components must be made without employing significant amounts of the element antimony. Antimony has long been incorporated into cationic photoinitiators—particularly sulfonium-based cationic photoinitiators—because it is both cost-effective and known to assist in the promotion of rapid ring-opening polymerization reactions. However, substances possessing this element pose environmental risks, and therefore not permitted for use in many investment casting operations.

Additionally, the three-dimensional parts for investment casting operations must be dimensionally accurate, precise, and retain such accuracy and precision over time, particularly in the presence of moisture or humidity. Certain steps in the investment casting process often involve the addition of water or water-containing solvents, and so the three-dimensional part must possess a significant ability to withstand part-deforming (and mechanical property altering) water uptake.

Also, to be useful for investment casting operations, the three-dimensional parts made from liquid radiation curable compositions for additive fabrication must burn off efficiently and cleanly. This can be measured by the amount of ash content in the part after being subjected to an investment casting burnout process. Additionally, the residue which remains should ideally not stick or leave glassy patches or crusty deposits in molds after burnout, as such phenomena result in inclusions and other surface defects in the final investment casting. As no resins heretofore formulated for investment casting operations have sufficiently minimized this effect, additional time and resources are currently necessary to properly clean molds after the burnout process.

From the foregoing, it is evident that a heretofore unmet need exists to provide improved hybrid curable, liquid radiation resin compositions that possess improved green strength and epoxy conversions, and simultaneously produce parts which exhibit excellent dimensional accuracy, precision, stability, resistance to water absorption, minimal part deformation, and low ash-content upon burning, such that they are ideal for investment casting applications, achieving all such properties while being substantially devoid of antimony-containing substances.

BRIEF SUMMARY

A first aspect of the claimed invention is a liquid radiation curable composition for additive fabrication comprising:
a cationically polymerizable component;
a radically polymerizable component;
an antimony-free cationic photoinitiator with
an anion selected from the group consisting of $PF_6^-$, $BF_4^-$, $((CF_3)_2C_6H_3)_4B^-$, $(C_6F_5)_4Ga^-$, $((CF_3)_2C_6H_3)_4Ga^-$, trifluoromethanesulfonates, nonafluorobutanesulfonates, methanesulfonates, butanesulfonates, benzenesulfonates, p-toluenesulfonates, and $PF_\alpha(R_f)_\beta$, wherein α and β are the same or different, and are integers from 1-8, and $R_f$ contains a carbon atom and a halogen atom, and
a cation of the following general formula I:

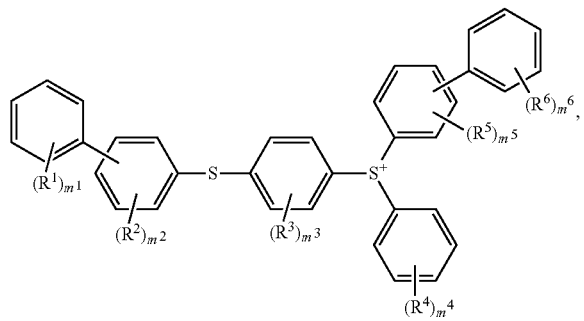

Formula I wherein $R^1$, $R^2$, $R^3$, $R^5$ and $R^6$ each independently represent an alkyl group, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, $R^4$ represents an alkyl group, a hydroxy group, an alkoxy group, an alkylcarbonyl group, an alkoxycarbonyl group, an acyloxy group, an alkylthio group, a heterocyclic hydrocarbon group, an alkylsulfinyl group, an alkylsulfonyl group, a hydroxy(poly)alkyleneoxy group, an optionally substituted amino group, a cyano group, a nitro group, or a halogen atom, $m^1$ to $m^6$ each represent the number of occurrences of each of $R^1$ to $R^6$, $m^1$, $m^4$, and $m^6$ each represent an integer of 0 to 5, and $m^2$, $m^3$, and $m^5$ each represent an integer of 0 to 4;
a photosensitizer; and
a free-radical photoinitiator.

A second aspect of the claimed invention is an additive manufacturing process for forming a three-dimensional object comprising the steps of: forming and selectively curing a layer of the liquid radiation curable composition for additive fabrication according to a first aspect of the claimed invention with actinic radiation, and repeating the steps of forming and selectively curing a layer of the liquid radiation curable resin composition for additive fabrication according to a first aspect of the claimed invention a plurality of times to obtain a three-dimensional object.

A third aspect of the claimed invention is the three-dimensional object formed by the process of a second aspect of the claimed invention from the liquid radiation curable composition for additive fabrication according to a first aspect of the claimed invention.

A fourth aspect of the claimed invention is a method of using a component photocured via additive fabrication in an investment casting process, the method comprising the steps of arranging one or more components photocured via an additive fabrication process into a desired configuration to form a configuration pattern; coating said configuration pattern with a refractory material to create an investment; heating said investment sufficiently to burn off the configuration pattern, thereby forming an investment mold with at least one void; directing a molten material to flow into the void of the investment mold, thereby substantially filling said void; cooling the molten material, such that it crystallizes or solidifies; and removing said investment mold to create an investment casting; wherein the one or more components contain, prior to photocuring via an additive fabrication process, a first antimony-free photoinitiator with an anion selected from the group consisting of $PF_6^-$, $BF_4^-$, $((CF_3)_2C_6H_3)_4B^-$, $(C_6F_5)_4Ga^-$, $((CF_3)_2C_6H_3)_4Ga^-$, trifluoromethanesulfonates, nonafluorobutanesulfonates, methanesulfonates, butanesulfonates, benzenesulfonates, p-toluenesulfonates, and $PF_\alpha(R_f)_\beta$, wherein α and β are the same or different and are integers from 1-8, and $R_f$ contains a carbon atom and a halogen atom, and
a cation of the following general formula I.

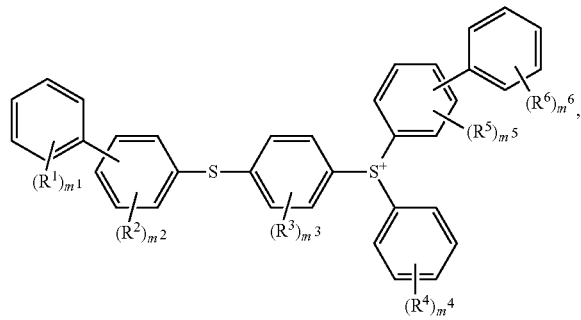

Formula I wherein $R^1$, $R^2$, $R^3$, $R^5$ and $R^6$ each independently represent an alkyl group, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, $R^4$ represents an alkyl group, a hydroxy group, an alkoxy group, an alkylcarbonyl group, an alkoxycarbonyl group, an acyloxy group, an alkylthio group, a heterocyclic hydrocarbon group, an alkylsulfinyl group, an alkylsulfonyl group, a hydroxy(poly)alkyleneoxy group, an optionally substituted amino group, a cyano group, a nitro group, or a halogen atom, $m^1$ to $m^6$ each represent the number of occurrences of each of $R^1$ to $R^6$, $m^1$, $m^4$, and $m^6$ each represent an integer of 0 to 5, and $m^2$, $m^3$, and $m^5$ each represent an integer of 0 to 4.

DETAILED DESCRIPTION

Figure 1:
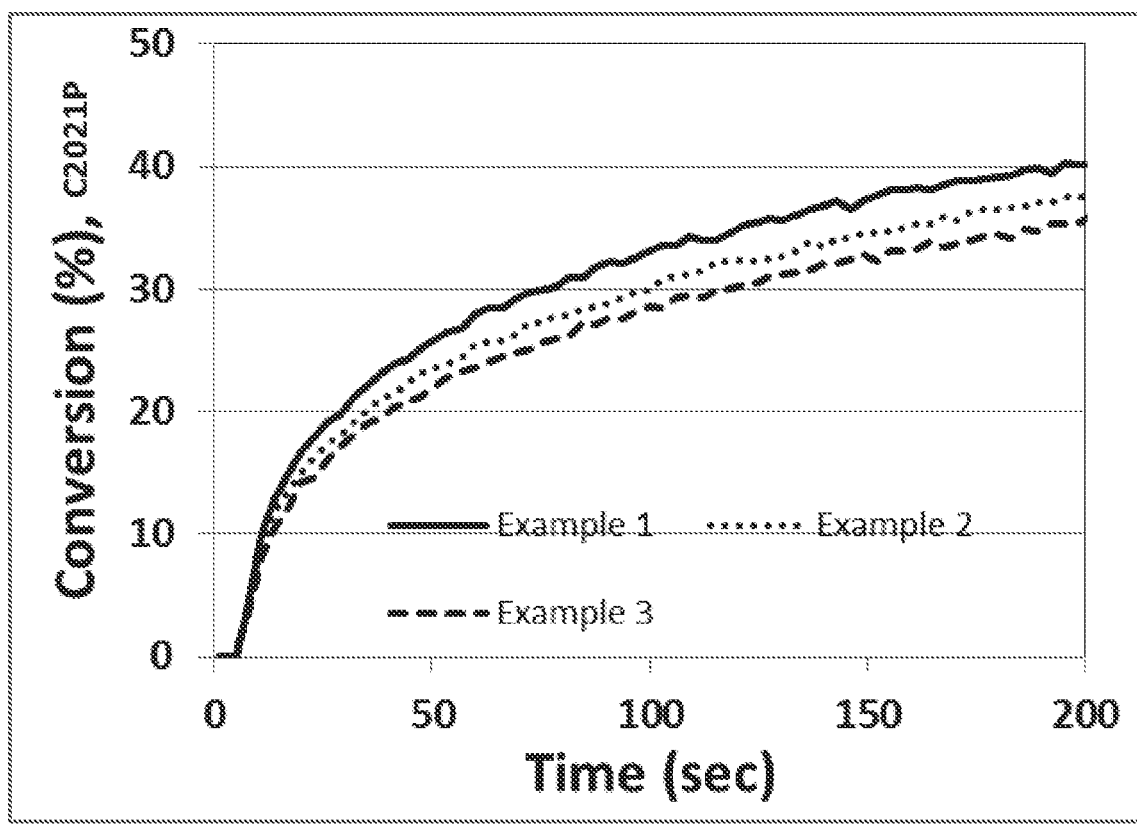
FIG. 1 is a plot depicting the Real Time Fourier Transform Infrared (RT-FTIR) of the cycloaliphatic epoxide conversion of three liquid radiation curable compositions for additive fabrication which possess an antimony-free, sulfonium salt cationic photoinitiator, with or without two different photosensitizers.

Throughout this document, if a composition or component is referred to as "antimony-free", "substantially devoid of elemental antimony", or "substantially devoid of an iodonium salt", or other similar nomenclature relative to any other substance, it is meant that such composition or component, where relevant, contains less than about 3 parts per million of the referenced substance, when measured by conventional methods (such as atomic emission spectroscopy) which are well-known according to those of ordinary skill in the art to which this invention applies.

A first embodiment of the claimed invention is a liquid radiation curable composition for additive fabrication comprising:

a cationically polymerizable component;

a radically polymerizable component;

an antimony-free cationic photoinitiator with an anion selected from the group consisting of $PF_6^-$, $BF_4^-$, $((CF_3)_2C_6H_3)_4B^-$, $(C_6F_5)_4Ga^-$, $((CF_3)_2C_6H_3)_4Ga^-$, trifluoromethanesulfonates, nonafluorobutanesulfonates, methanesulfonates, butanesulfonates, benzenesulfonates, p-toluenesulfonates, and $PF_\alpha(R_f)_\beta$, wherein $\alpha$ and $\beta$ are the same or different, and are integers from 1-8, and $R_f$ contains a carbon atom and a halogen atom, and a cation of the following general formula I:

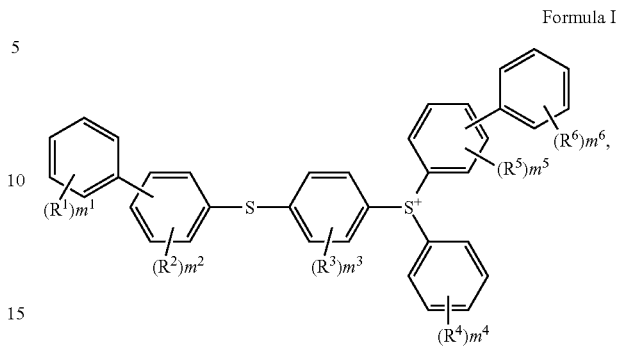

Formula I wherein $R^1$, $R^2$, $R^3$, $R^5$ and $R^6$ each independently represent an alkyl group, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, $R^4$ represents an alkyl group, a hydroxy group, an alkoxy group, an alkylcarbonyl group, an alkoxycarbonyl group, an acyloxy group, an alkylthio group, a heterocyclic hydrocarbon group, an alkylsulfinyl group, an alkylsulfonyl group, a hydroxy(poly)alkyleneoxy group, an optionally substituted amino group, a cyano group, a nitro group, or a halogen atom, $m^1$ to $m^6$ each represent the number of occurrences of each of $R^1$ to $R^6$, $m^1$, $m^4$, and $m^6$ each represent an integer of 0 to 5, and $m^2$, $m^3$, and $m^5$ each represent an integer of 0 to 4;

a photosensitizer; and a free-radical photoinitiator.

Cationically Polymerizable Component

In accordance with an embodiment, the liquid radiation curable resins for additive fabrication of the invention comprise at least one cationically polymerizable component; that is a component which undergoes polymerization initiated by cations or in the presence of acid generators. The cationically polymerizable components may be monomers, oligomers, and/or polymers, and may contain aliphatic, aromatic, cycloaliphatic, arylaliphatic, heterocyclic moiety(ies), and any combination thereof. Suitable cyclic ether compounds can comprise cyclic ether groups as side groups or groups that form part of an alicyclic or heterocyclic ring system.

The cationic polymerizable component is selected from the group consisting of cyclic ether compounds, cyclic acetal compounds, cyclic thioethers compounds, spiro-orthoester compounds, cyclic lactone compounds, and vinyl ether compounds, and any combination thereof.

Suitable cationically polymerizable components include cyclic ether compounds such as epoxy compounds and oxetanes, cyclic lactone compounds, cyclic acetal compounds, cyclic thioether compounds, spiro orthoester compounds, and vinylether compounds. Specific examples of cationically polymerizable components include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)-cyclohexane-1,4-dioxane, bis(3,4-epoxycyclohexylmethyl)adipate, vinylcyclohexene oxide, 4-vinylepoxycyclohexane, vinylcyclohexene dioxide, limonene oxide, limonene dioxide, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexane carboxylates, trimethylcaprolactone-modified 3,4-epoxycyclohexylmethyl-3',4'-epoxycyclohexane carboxylates, β-methyl-δ-valerolactone-modified 3,4-epoxycyclohexcylmethyl-3',4'-epoxycyclohexane carboxylates, methylenebis(3,4-epoxycyclohexane), bicyclohexyl-3,3'-epoxide, bis(3,4-epoxycyclohexyl) with a linkage of —O—, —S—, —SO—, —SO$_2$—, —C(CH$_3$)$_2$—, —CBr$_2$—, —C(CBr$_3$)$_2$—, —C(CF$_3$)$_2$—, —C(CCl$_3$)$_2$—, or —CH(C$_6$H$_5$)—, dicyclopentadiene diepoxide, di(3,4-epoxycyclohexylmethyl) ether of ethylene glycol, ethylenebis(3,4-epoxycyclohexanecarboxylate), epoxyhexahydrodioctylphthalate, epoxyhexahydro-di-2-ethylhexyl phthalate, 1,4-butanediol diglycidyl ether, 1,6-hexanediol diglycidyl ether, neopentylglycol diglycidyl ether, glycerol triglycidyl ether, trimethylolpropane triglycidyl ether, polyethylene glycol diglycidyl ether, polypropylene glycol diglycidyl ether, diglycidyl esters of aliphatic long-chain dibasic acids, monoglycidyl ethers of aliphatic higher alcohols, monoglycidyl ethers of phenol, cresol, butyl phenol, or polyether alcohols obtained by the addition of alkylene oxide to these compounds, glycidyl esters of higher fatty acids, epoxybutylstearic acid, epoxyoctylstearic acid, epoxidated linseed oil, epoxidated polybutadiene, 1,4-bis[(3-ethyl-3-oxetanylmethoxy)methyl]benzene, 3-ethyl-3-hydroxymethyloxetane, 3-ethyl-3-(3-hydroxypropyl)oxymethyloxetane, 3-ethyl-3-(4-hydroxybutyl)oxymethyloxetane, 3-ethyl-3-(5-hydroxypentyl)oxymethyloxetane, 3-ethyl-3-phenoxymethyloxetane, bis((1-ethyl(3-oxetanyl))methyl)ether, 3-ethyl-3-((2-ethylhexyloxy)methyl)oxetane, 3-ethyl-((triethoxysilylpropoxymethyl)oxetane, 3-(meth)-allyloxymethyl-3-ethyloxetane, 3-hydroxymethyl-3-ethyl-oxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]-benzene, [1-(3-ethyl-3-oxetanylmethoxy)ethyl]phenyl ether, isobutoxymethyl(3-ethyl-3-oxetanylmethyl)ether, 2-ethylhexyl(3-ethyl-3-oxetanylmethyl)ether, ethyldiethylene glycol(3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl(3-ethyl-3-oxetanylmethyl)ether, tetrahydrofurfuyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, and any combination thereof.

The cationically polymerizable component may optionally also contain polyfunctional materials including dendritic polymers such as dendrimers, linear dendritic polymers, dendrigraft polymers, hyperbranched polymers, star branched polymers, and hypergraft polymers with epoxy or oxetane functional groups. The dendritic polymers may contain one type of polymerizable functional group or different types of polymerizable functional groups, for example, epoxy and oxetane functions.

In an embodiment, the composition of the present invention also comprises one or more mono or poly glycidylethers of aliphatic alcohols, aliphatic polyols, polyesterpolyols or polyetherpolyols. Examples of preferred components include 1,4-butanedioldiglycidylether, glycidylethers of polyoxyethylene and polyoxypropylene glycols and triols of molecular weights from about 200 to about 10,000; glycidylethers of polytetramethylene glycol or poly(oxyethylene-oxybutylene) random or block copolymers. In a specific embodiment, the cationically polymerizable component comprises a polyfunctional glycidylether that lacks a cyclohexane ring in the molecule. In another specific embodiment, the cationically polymerizable component includes a neopentyl glycol diglycidyl ether. In another specific embodiment, the cationically polymerizable component includes a 1,4 cyclohexanedimethanol diglycidyl ether.

Examples of commercially available preferred polyfunctional glycidylethers are Erisys™ GE 22 (Erisys™ products are available from Emerald Performance Materials™), Heloxy™ 48, Heloxy™ 67, Heloxy™ 68, Heloxy™ 107 (Heloxy™ modifiers are available from Momentive Specialty Chemicals), and Grilonit® F713. Examples of commercially available preferred monofunctional glycidylethers are Heloxy™ 71, Heloxy™ 505, Heloxy™ 7, Heloxy™ 8 and Heloxy™ 61.

In an embodiment, the epoxide is 3,4-epoxycyclohexylmethyl-3',4-epoxycyclohexanecarboxylate (available as CELLOXIDE™ 2021P from Daicel Chemical, or as CYRACURE™ UVR-6105 from Dow Chemical), hydrogenated bisphenol A-epichlorohydrin based epoxy resin (available as EPON™ 1510 from Momentive), 1,4-cyclohexanedimethanol diglycidyl ether (available as HELOXY™ 107 from Momentive), a hydrogenated bisphenol A diglycidyl ether (available as EPON™ 825 from Momentive) a mixture of dicyclohexyl diepoxide and nanosilica (available as NANOPOX™), and any combination thereof.

The above-mentioned cationically polymerizable compounds can be used singly or in combination of two or more thereof. In embodiments of the invention, the cationic polymerizable component further comprises at least two different epoxy components. In a specific embodiment, the cationic polymerizable component includes a cycloaliphatic epoxy, for example, a cycloaliphatic epoxy with 2 or more than 2 epoxy groups. In another specific embodiment, the cationic polymerizable component includes an epoxy having an aromatic or aliphatic glycidyl ether group with 2 (difunctional) or more than 2 (polyfunctional) epoxy groups.

The liquid radiation curable resin for additive fabrication can therefore include suitable amounts of the cationic polymerizable component, for example, in certain embodiments, in an amount from about 30 wt % to about 85% by weight of the resin composition, in further embodiments from about 35 wt % to about 75 wt % of the resin composition, and in further embodiments from about 35 wt % to about 65 wt % of the resin composition.

In other embodiments of the invention, the cationically polymerizable component also includes one or more oxetanes. In a specific embodiment, the cationic polymerizable component includes an oxetane, for example, an oxetane containing 1, 2 or more than 2 oxetane groups. If utilized in the composition, the oxetane component is present in a suitable amount from about 5 to about 30 wt % of the resin composition. In another embodiment, the oxetane component is present in an amount from about 10 to about 25 wt % of the resin composition, and in yet another embodiment, the oxetane component is present in an amount from 15 to about 20 wt % of the resin composition.

Radically Polymerizable Component

In accordance with an embodiment of the invention, the liquid radiation curable resin for additive fabrication of the invention comprises at least one free-radical polymerizable component, that is, a component which undergoes polymerization initiated by free radicals. The free-radical polymerizable components are monomers, oligomers, and/or polymers; they are monofunctional or polyfunctional materials, i.e., have 1, 2, 3, 4, 5, 6, 7, 8, 9, 10 . . . 20 . . . 30 . . . 40 . . . 50 . . . 100, or more functional groups that can polymerize by free radical initiation, may contain aliphatic, aromatic, cycloaliphatic, arylaliphatic, heterocyclic moiety (ies), or any combination thereof. Examples of polyfunctional materials include dendritic polymers such as dendrimers, linear dendritic polymers, dendrigraft polymers, hyperbranched polymers, star branched polymers, and hypergraft polymers; see, e.g., US 2009/0093564 A1. The dendritic polymers may contain one type of polymerizable functional group or different types of polymerizable functional groups, for example, acrylates and methacrylate functions.

Examples of free-radical polymerizable components include acrylates and methacrylates such as isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloyl morpholine, (meth)acrylic acid, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, caprolactone acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, tridecyl (meth)acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, beta-carboxyethyl (meth)acrylate, phthalic acid (meth)acrylate, dimethylaminoethyl (meth)acrylate, diethylaminoethyl (meth)acrylate, butylcarbamylethyl (meth)acrylate, n-isopropyl (meth)acrylamide fluorinated (meth)acrylate, 7-amino-3,7-dimethyloctyl (meth)acrylate.

Examples of polyfunctional free-radical polymerizable components include those with (meth)acryloyl groups such as trimethylolpropane tri(meth)acrylate, pentaerythritol (meth)acrylate, ethylene glycol di(meth)acrylate, bisphenol A diglycidyl ether di(meth)acrylate, dicyclopentadiene dimethanol di(meth)acrylate, [2-[1,1-dimethyl-2-[(1-oxoallyl)oxy]ethyl]-5-ethyl-1,3-dioxan-5-yl]methyl acrylate; 3,9-bis(1,1-dimethyl-2-hydroxyethyl)-2,4,8,10-tetraoxaspiro[5.5]undecane di(meth)acrylate; dipentaerythritol monohydroxypenta(meth)acrylate, propoxylated trimethylolpropane tri(meth)acrylate, propoxylated neopentyl glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, $C_7$-$C_{20}$ alkyl di(meth)acrylates, tris(2-hydroxyethyl)isocyanurate tri(meth)acrylate, tris(2-hydroxyethyl)isocyanurate di(meth)acrylate, pentaerythritol tri(meth)acrylate, pentaerythritol tetra(meth)acrylate, dipentaerythritol hexa(meth)acrylate, tricyclodecane diyl dimethyl di(meth)acrylate and alkoxylated versions (e.g., ethoxylated and/or propoxylated) of any of the preceding monomers, and also di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated bisphenol A, and triethylene glycol divinyl ether, and adducts of hydroxyethyl acrylate.

In accordance with an embodiment, the radically polymerizable component is a polyfunctional (meth)acrylate. The polyfunctional (meth)acrylates may include all methacryloyl groups, all acryloyl groups, or any combination of methacryloyl and acryloyl groups. In an embodiment, the free-radical polymerizable component is selected from the group consisting of bisphenol A diglycidyl ether di(meth)acrylate, ethoxylated or propoxylated bisphenol A or bisphenol F di(meth)acrylate, dicyclopentadiene dimethanol di(meth)acrylate, [2-[1,1-dimethyl-2-[(1-oxoallyl)oxy]ethyl]-5-ethyl-1,3-dioxan-5-yl]methyl acrylate, dipentaerythritol monohydroxypenta(meth)acrylate, dipentaerythritol penta(meth)acrylate, dipentaerythritol hexa(meth)crylate, propoxylated trimethylolpropane tri(meth)acrylate, and propoxylated neopentyl glycol di(meth)acrylate, and any combination thereof.

In a preferred embodiment, the polyfunctional (meth)acrylate has more than 2, more preferably more than 3, and more preferably greater than 4 functional groups.

In another preferred embodiment, the radically polymerizable component consists exclusively of a single polyfunctional (meth)acrylate component. In further embodiments, the exclusive radically polymerizable component is tetra-functional, in further embodiments, the exclusive radically polymerizable component is penta-functional, and in further embodiments, the exclusive radically polymerizable component is hexa-functional.

In another embodiment, the free-radical polymerizable component is selected from the group consisting of bisphenol A diglycidyl ether diacrylate, dicyclopentadiene dimethanol diacrylate, [2-[1,1-dimethyl-2-[(1-oxoallyl)oxy]ethyl]-5-ethyl-1,3-dioxan-5-yl]methyl acrylate, dipentaerythritol monohydroxypentaacrylate, propoxylated trimethylolpropane triacrylate, and propoxylated neopentyl glycol diacrylate, and any combination thereof.

In specific embodiments, the liquid radiation curable resins for additive fabrication of the invention include one or more of bisphenol A diglycidyl ether di(meth)acrylate, dicyclopentadiene dimethanol di(meth)acrylate, dipentaerythritol monohydroxypenta(meth)acrylate, propoxylated trimethylolpropane tri(meth)acrylate, and/or propoxylated neopentyl glycol di(meth)acrylate, and more specifically one or more of bisphenol A diglycidyl ether diacrylate, dicyclopentadiene dimethanol diacrylate, dipentaerythritol pentaacrylate, propoxylated trimethylolpropane triacrylate, and/or propoxylated neopentyl glycol diacrylate.

The above-mentioned radically polymerizable compounds can be used singly or in combination of two or more thereof. The liquid radiation curable resin for additive fabrication can include any suitable amount of the free-radical polymerizable components, for example, in certain embodiments, in an amount up to about 40 wt % of the resin composition, in certain embodiments, from about 2 to about 40 wt % of the resin composition, in other embodiments from about 5 to about 30 wt %, and in further embodiments from about 10 to about 20 wt % of the resin composition.

The antimony-free liquid radiation curable resin for additive fabrication of the present invention also includes a photoinitiating system. The photoinitiating system includes a free-radical photoinitiator and a cationic photoinitiator. In accordance with an embodiment, the liquid radiation curable resin composition includes a photoinitiating system contains at least one photoinitiator having a cationic initiating function, and at least one photoinitiator having a free radical initiating function. Additionally, the photoinitiating system can include a photoinitiator that contains both free-radical initiating function and cationic initiating function on the same molecule. The photoinitiator is a compound that chemically changes due to the action of light or the synergy between the action of light and the electronic excitation of a sensitizing dye to produce at least one of a radical, an acid, and a base.

Antimony-Free Cationic Photoinitiator

In accordance with an embodiment, the liquid radiation curable resin composition includes an antimony-free cationic photoinitiator. Cationic photoinitiators initiate cationic ring-opening polymerization upon irradiation of light. In a preferred embodiment, a sulfonium salt photoinitiator is used, for example, dialkylphenacylsulfonium salts, aromatic sulfonium salts, triaryl sulfonium salts, and any combination thereof.

In another embodiment, the cation is a polymeric sulfonium salt, such as the relevant disclosure of, for example, U.S. Pat. No. 5,380,923 or 5,047,568, or other aromatic heteroatom-containing cations and naphthyl-sulfonium salts such as those described in, for example, U.S. Pat. Nos. 7,611,817, 7,230,122, US2011/0039205, US2009/0182172, U.S. Pat. No. 7,678,528, EP2308865, WO2010046240, or EP2218715. Onium salts, e.g., iodonium salts and sulfonium salts, and ferrocenium salts, have the advantage that they are generally more thermally stable.

In an embodiment of the invention, the liquid radiation curable resin for additive fabrication comprises an aromatic triaryl sulfonium salt cationic photoinitiator. The use of aromatic triaryl sulfonium salts in additive fabrication applications is known. Please see, e.g., US 20120251841 to DSM IP Assets, B.V., and U.S. Pat. No. 6,368,769, to Asahi Denki Kogyo, which discuss certain aromatic triaryl sulfonium salts, and the use of such compounds in stereolithography applications. Triarylsulfonium salts are also disclosed in, for example, *J Photopolymer Science & Tech* (2000), 13(1), 117-118 and *J Poly Science*, Part A (2008), 46(11), 3820-29. Triarylsulfonium salts $Ar_3S^+MXn^-$ with complex metal halide anions such as $BF_4^-$, $AsF_6^-$, $PF_6^-$, and $SbF_6^-$, are also disclosed in *J Polymr Sci*, Part A (1996), 34(16), 3231-3253.

The use of aromatic triaryl sulfonium salts as the cationic photoinitiator in liquid radiation curable resins is desirable in additive fabrication processes because the resulting resin attains a fast photospeed, good thermal-stability, and good photo-stability.

Not all aromatic triaryl sulfonium cationic photoinitiators are equivalent, however. A particularly preferred aromatic triaryl sulfonium cationic photoinitiator has an anion that is a fluoroalkyl-substituted fluorophosphate. Commercial examples of an aromatic triaryl sulfonium cationic photoinitiator having a fluoroalkyl-substituted fluorophosphate anion is the CPI-200 series (for example CPI-200K® or CPI-210S®) or 300-PG, available from San-Apro Limited.

In a particularly preferred embodiment, the cationic photoinitiator is substantially devoid of elemental antimony, and possesses a sulfonium salt-based cation of the following general formula I:

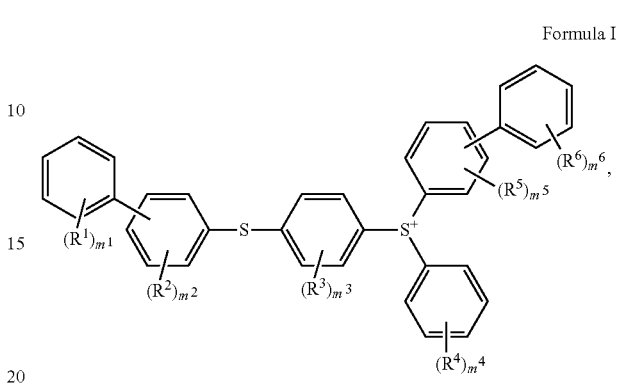

Formula I wherein $R^1$, $R^2$, $R^3$, $R^5$ and $R^6$ each independently represent an alkyl group, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy (poly)alkyleneoxy group, an optionally substituted amino group, a cyano group, a nitro group, or a halogen atom, $R^4$ represents an alkyl group, a hydroxy group, an alkoxy group, an alkylcarbonyl group, an alkoxycarbonyl group, an acyloxy group, an alkylthio group, a heterocyclic hydrocarbon group, an alkylsulfinyl group, an alkylsulfonyl group, a hydroxy(poly)alkyleneoxy group, an optionally substituted amino group, a cyano group, a nitro group, or a halogen atom, $m^1$ to $m^6$ each represent the number of occurrences of each of $R^1$ to $R^6$, $m^1$, $m^4$, and $m^6$ each represent an integer of 0 to 5, and $m^2$, $m^3$, and $m^5$ each represent an integer of 0 to 4. In a preferred embodiment, the cationic photoinitiator is also substantially devoid of any iodonium salt.

In a particularly preferred embodiment, the cationic photoinitiator has an anion selected from the group consisting of $PF_6^-$, $BF_4^-$, $((CF_3)_2C_6H_3)_4B^-$, $(C_6F_5)_4Ga^-$, $((CF_3)_2C_6H_3)_4Ga^-$, trifluoromethanesulfonates, nonafluorobutanesulfonates, methanesulfonates, butanesulfonates, benzenesulfonates, p-toluenesulfonates, and those represented by the formula $PF_\alpha(R_f)_\beta$, wherein α and β are the same or different, and are integers from 1-8, and $R_f$ contains a carbon atom and a halogen atom.

In a particularly preferred embodiment, the anion is a fluoroalkyl-substituted fluorophosphate. In a particularly preferred embodiment, the anion is $(CF_3CF_2)_3PF_3^-$.

The photoinitiator employed naturally depends upon the wavelength of the radiation source under which the liquid radiation curable composition for additive fabrication is designed to be polymerized. In various embodiments, the liquid radiation curable resin composition for additive fabrication may be irradiated by laser or LED light operating at any wavelength in either the UV or visible light spectrum. In particular embodiments, the irradiation is from a laser or LED emitting a wavelength of from 340 nm to 415 nm. In particular embodiments, the laser or LED source emits a peak wavelength of about 340 nm, 355 nm, 365 nm, 375 nm, 385 nm, 395 nm, 405 nm, or 415 nm.

Examples of antimony-free cationic photoinitiators useful for curing at 300-475 nm, particularly at 365 nm UV light, include 4-[4-(3-chlorobenzoyl)phenylthio]phenylbis(4-fluorophenyl)sulfonium tetrakis(pentafluorophenyl)borate, 4-[4-(3-chlorobenzoyl)phenylthio]phenylbis(4-fluorophenyl) sulfonium tetrakis(3,5-difluoro-4-methyloxyphenyl)borate, and 4-[4-(3-chlorobenzoyl)phenylthio]phenylbis(4-fluorophenyl)sulfonium tetrakis(2,3,5,6-tetrafluoro-4-methyloxyphenyl)borate.

In an embodiment, other potential commercial cationic photoinitiators include, either alone or in a mixture: tris(4-(4-acetylphenyl)thiophenyl)sulfonium tris[(trifluoromethyl)sulfonyl]methide (Irgacure® GSID 26-1 from BASF), and tris(4-(4-acetylphenyl)thiophenyl)sulfonium hexafluorophosphate (Irgacure® 270 from BASF), and aromatic sulfonium salts with anions of $(PF_{6-m}(C_nF_{2n+1})_m)^-$ where m is an integer from 1 to 5, and n is an integer from 1 to 4 (available as CPI-200K or CPI-200S, which are monovalent sulfonium salts from San-Apro Ltd., TK-1 available from San-Apro Ltd., or HS-1 available from San-Apro Ltd.).

In preferred embodiments, the liquid radiation curable resins for additive fabrication includes cationic photoinitiator as described above in combinations of one or more, and also with co-initiators or photosensitizers, along with a cationic polymerizable component and, optionally, free-radical polymerizable components and free-radical photoinitiators.

The liquid radiation curable resin composition can include any suitable amount of the cationic photoinitiator, for example, in certain embodiments, in an amount up to about 15% by weight of the resin composition, in certain embodiments, up to about 5% by weight of the resin composition, and in further embodiments from about 2% to about 10% by weight of the resin composition, and in other embodiments, from about 0.1% to about 5% by weight of the resin composition. In a further embodiment, the amount of cationic photoinitiator is from about 0.2 wt % to about 4 wt % of the total resin composition, and in other embodiments from about 0.5 wt % to about 3 wt %.

For purposes herein, when determining the amount of the cationic photoinitiator present in the formulation, only the weight of the "active ingredient" is counted. Commercial cationic photoinitiators typically are manufactured and shipped in an solvent, like inert substances such as propylene carbonate, acrylate monomers such as propylene glycol momomethyl ether acrylate, or epoxy/oxetane monomers. Therefore, only the salt portion of the raw material is considered when determining the amount of cationic photoinitiator present in the composition. By way of example, therefore, the commercial product Irgacure PAG-290 may be purchased (from BASF) as a solution consisting of 20% by weight of a triarylsulfonium salt with a tetrakis(pentafluorophenyl)borate anion, and 80% by weight of a dispersant (which itself is a solution of oxetane monomer and propylene carbonate). Therefore, if PAG-290 were present in an amount of 5% by weight relative to the entire composition, only 1% of the entire composition would be considered to be a "cationic photoinitiator" according to the invention as presently claimed.

Photosensitizer

In some embodiments, depending on the wavelength of light used for curing the liquid radiation curable resin, it is desirable for the liquid radiation curable resin composition to include a photosensitizer. The term "photosensitizer" is used to refer to any substance that either increases the rate of photoinitiated polymerization or shifts the wavelength at which polymerization occurs; see textbook by G. Odian, *Principles of Polymerization*, 3$^{rd}$ Ed., 1991, page 222. A photosensitizer or co-initiator may be used to improve the activity of the cationic photoinitiator. The sensitizer used in combination with the above-mentioned antimony-free cationic photoinitiators are not necessarily restricted. A variety of compounds can be used as photosensitizers, including heterocyclic and fused-ring aromatic hydrocarbons, organic dyes, and aromatic ketones. Examples of sensitizers include compounds disclosed by J. V. Crivello in *Advances in Polymer Science*, 62, 1 (1984), and by J. V. Crivello & K. Dietliker, "Photoinitiators for Cationic Polymerization" in Chemistry & technology of UV & EB formulation for coatings, inks & paints. Volume III, Photoinitiators for free radical and cationic polymerization. by K. Dietliker; [Ed. by P. K. T. Oldring], SITA Technology Ltd, London, 1991. Specific examples include polyaromatic hydrocarbons and their derivatives such as anthracene, pyrene, perylene and their derivatives, thioxanthones, α-hydroxyalkylphenones, 4-benzoyl-4'-methyldiphenyl sulfide, organic dyes such as acridine orange, and benzoflavin, and other aromatic ketones.

Further examples of suitable photosensitizers include those selected from the group consisting of methanones, xanthenones, pyrenemethanols, anthracenes, pyrene, perylene, quinones, xanthones, thioxanthones, benzoyl esters, benzophenones, and any combination thereof. Particular examples of photosensitizers include those selected from the group consisting of [4-[(4-methylphenyl)thio]phenyl]phenyl-methanone, isopropyl-9H-thioxanthen-9-one, 1-pyrenemethanol, 9-(hydroxymethyl)anthracene, 9,10-diethoxyanthracene, 9,10-dimethoxyanthracene, 9,10-dipropoxyanthracene, 9,10-dibutyloxyanthracene, 9-anthracenemethanol acetate, 2-ethyl-9,10-dimethoxyanthracene, 2-methyl-9,10-dimethoxyanthracene, 2-t-butyl-9,10-dimethoxyanthracene, 2-ethyl-9,10-diethoxyanthracene and 2-methyl-9,10-diethoxyanthracene, anthracene, anthraquinones, 2-methylanthraquinone, 2-ethylanthraquinone, 2-tertbutylanthraquinone, 1-chloroanthraquinone, 2-amylanthraquinone, thioxanthones and xanthones, isopropyl thioxanthone, 2-chlorothioxanthone, 2,4-diethylthioxanthone, 1-chloro-4-propoxythioxanthone, methyl benzoyl formate (Darocur MBF from BASF), methyl-2-benzoyl benzoate (Chivacure OMB from Chitec), 4-benzoyl-4'-methyl diphenyl sulphide (Chivacure BMS from Chitec), 4,4'-bis (diethylamino) benzophenone (Chivacure EMK from Chitec), and any combination thereof.

According to a particularly preferred embodiment, the photosensitizer possesses the following general structure (Formula II):

Formula II

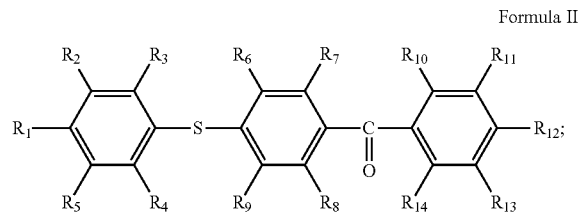

wherein $R_1$-$R_{14}$ are independently H or a $C_1$-$C_8$ saturated or unsaturated, branched or unbranched, substituted, or unsubstituted hydrocarbyl.

Inventors have surprisingly found that photosensitizers possessing structures according to Formula II are particularly well-suited in promoting the rapid and efficient cationic polymerization of cycloaliphatic epoxies and oxetanes when employed in conjunction with antimony-free, sulfonium-based cationic photoinitiators according to Formula I above. This is true despite the fact that r-benzoyl-r-methyldiphenyl sulfide photosensitizers are not known to be designed for or suitable for use with sulfonium salt-based photoinitiators generally. Rather, such photosensitizers are especially preferred for use with iodonium salts in part because of their lack of both: (1) significant light absorption above 400 nm, and (2) their relative inability to impart color into the three-dimensional articles created at least in part therefrom. This is particularly true when an antimony-free cationic photoinitiator according to Formula I is employed in an amount by 2 to 100 parts for every 1 part of the photosensitizer according to Formula II, more preferably in a ratio from 5:1 to 50:1. In another embodiment, the ratio is from 10:1 to 15:1.

The liquid radiation curable resin composition for additive fabrication can include any suitable amount of the photosensitizer, for example, in certain embodiments, in an amount up to about 10% by weight of the resin composition, in certain embodiments, up to about 5% by weight of the resin composition, and in further embodiments from about 0.05% to about 2% by weight of the resin composition. In an embodiment, the above ranges are particularly suitable for use with epoxy monomers.

UV Absorbers

As used herein, UV absorbers, or UV stabilizers, are components which dissipate the absorbed light energy from UV rays as heat by reversible intramolecular proton transfer. This tends to reduce the absorption of UV rays by the polymer matrix. Typical UV-absorbers are oxanilides for polyamides, benzophenones for PVC, benzotriazoles and hydroxyphenyltriazines for polycarbonate.

UV absorbers are commonly incorporated into thermoplastic or thermally curable thermosetting films and/or coatings, as well as cosmetics, skin care products, and sunscreens. Their primary function is to protect the composition into which they are incorporated (or the substrate onto which the composition is applied) from weathering by preventing the long-term degradation effects of ultraviolet radiation. Different UV stabilizers are utilized depending upon the substrate, intended functional life, and sensitivity to UV degradation.

The very light-blocking tendency of UV absorbers often utilized to advantage in the aforementioned applications would be considered a significant drawback in compositions relying on UV light to catalyze polymer network formation, however. This is because such components would compete with corresponding photoinitiators for the finite amount of UV energy applied, thereby naturally reducing the number of photoactive species generated thereby. All else being equal, this would detrimentally effect both cure depth and cure speed of the photopolymerizable compositions into which they were incorporated. The net expected effect of UV absorber-containing compositions would be, at minimum, a relative increase in the time required to build solid parts via additive fabrication processes, and at maximum, an elimination of any effectiveness at curing upon exposure to actinic radiation via UV wavelengths at all.

Inventors have discovered that certain quantities of UV absorbers may nonetheless be usefully incorporated into radiation curable compositions formulated for additive fabrication possesses when included with the other compositional elements as prescribed herein. That is, they can be effectively used to "fine tune" the penetration depth of their associated resin, thereby enabling the creation of more precise feature formation in a layerwise additive fabrication build process. Such properties are particularly useful in investment casting applications where fine feature precision is often a critical design feature.

Furthermore, inventors have surprisingly discovered that the incorporation of UV absorbers is possible without the expected significant corresponding cure speed reduction of the particular layer to be built. Without wishing to be bound by any theory, inventors believe that this effect is attributable to the fact that the presence of the UV-absorber will result in a local increase of polymerization temperature. Consequently, a higher polymerization temperature will significantly enhance the rate of polymerization of the temperature-dependent cationic part of the formulation into which the UV absorber is associated. This hypothesized phenomenon tends to offset the otherwise cure-slowing effects that UV absorbers are known to typically impart, at least when they are included in compositions also possessing: (1) a cationically curable component, as well as (2) a cationic photoinitiator with a relatively high absorbance at the wavelength (or wavelengths) under which the particular additive fabrication process is carried out.

This offsetting effect has been discovered to be particularly useful for the formulation of radiation curable compositions utilized in additive fabrication processes employing LED-based light sources emitting radiation at longer wavelengths than the 355 nm variants commonly used in laser-based systems. This is because inventors have also discovered that, all else being equal, there exists a reduced absorption of photoinitiators in LED-based cure environments when compared to those same photoinitiators in otherwise identical laser-based cure environments. In other words, inventors have discovered that the light penetration depth in formulations exposed to a radiation source employing LED optics is significantly higher than identical formulations exposed to radiation sources employing laser-based optics at an identical peak operating wavelength and imparting an identical dose. Inventors advantageously compensated for this discovered LED-induced phenomenon via the addition of a UV absorber component. This "right sizing" of a radiation source's penetration depth, coupled with the hypothesized increase in local polymerization temperature imparted by virtue of the UV absorber's action, is particularly also beneficial for speeding-up cationic polymerization under such specialized cure conditions.

In an embodiment, the UV absorber is chosen from one or more of the following classes of compounds:

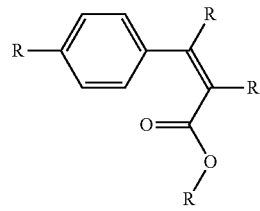

Cinnamate derivates

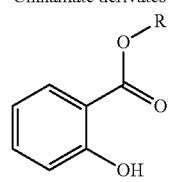

Salicylate derivates

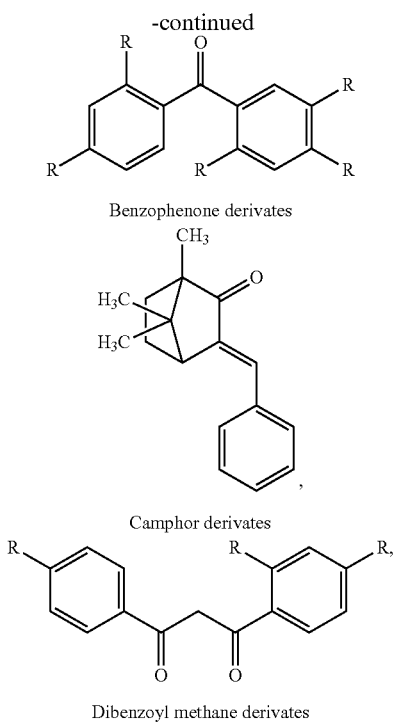

Benzophenone derivates

Camphor derivates

Dibenzoyl methane derivates and any combination thereof. Commercial examples of UV absorbers of the aforementioned classes may include many of the PARSOL® portfolio of UV filters, available from DSM, including PARSOL® MCX, PARSOL® 340, PARSOL® 1789, PARSOL® SLX, PARSOL® HS, PARSOL® EHS, and PARSOL® 5000.

In a preferred embodiment, the UV absorber comprises a benzophenone derivative of the following structure:

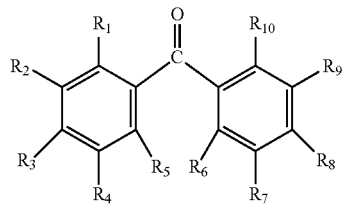

wherein $R_1$ to $R_{10}$ are the same or different, and represent a hydroxyl group, hydrogen atom or a $C_1$-$C_8$ saturated or unsaturated, branched or unbranched, substituted, or unsubstituted hydrocarbyl substituent, further wherein at least one of $R_1$, $R_5$, $R_6$, or $R_{10}$ is a hydroxyl group.

In a preferred embodiment, the UV absorber comprises one or more benzophenone compounds such as 2-hydroxy-4-methoxybenzophenone, 2,4-dihydroxybenzophenone, or 2-hydroxy-4-n-octoxybenzophenone.

The UV absorbers described above may be advantageously used singularly or in combinations of two or more. The liquid radiation curable resin composition for additive fabrication can include any suitable amount of the UV absorber component, for example, in certain embodiments, in an amount up to about 5% by weight of the resin composition, in certain embodiments, up to about 3% by weight of the resin composition, and in further embodiments from about 0.01% to about 3% by weight of the resin composition, or from about 0.05% to about 3% by weight of the composition, or from about 0.1% to about 1% by weight of the composition. If the quantity of the UV absorber becomes too large, the penetration depth of the associated resin becomes too small to be practically useful in additive fabrication layerwise build processes. If the quantity is too small, the UV absorber may have little or no practical effect.

Free-Radical Photoinitiator

In a particularly preferred embodiment of the invention, the composition also includes a free-radical photoinitiator. Typically, free radical photoinitiators are divided into those that form radicals by cleavage, known as "Norrish Type I" and those that form radicals by hydrogen abstraction, known as "Norrish type II". The Norrish type II photoinitiators require a hydrogen donor, which serves as the free radical source. As the initiation is based on a bimolecular reaction, the Norrrish type II photoinitiators are generally slower than Norrish type I photoinitiators which are based on the unimolecular formation of radicals. On the other hand, Norrish type II photoinitiators possess better optical absorption properties in the near-UV spectroscopic region. Photolysis of aromatic ketones, such as benzophenone, thioxanthones, benzil, and quinones, in the presence of hydrogen donors, such as alcohols, amines, or thiols leads to the formation of a radical produced from the carbonyl compound (ketyl-type radical) and another radical derived from the hydrogen donor. The photopolymerization of vinyl monomers is usually initiated by the radicals produced from the hydrogen donor. The ketyl radicals are usually not reactive toward vinyl monomers because of the steric hindrance and the delocalization of an unpaired electron.

To successfully formulate a liquid radiation curable resin for additive fabrication, it is necessary to review the wavelength sensitivity of the photoinitiator(s) present in the resin composition to determine if they will be activated by the radiation source chosen to provide the curing light.

In accordance with an embodiment, the liquid radiation curable resin for additive fabrication includes at least one free radical photoinitiator, e.g., those selected from the group consisting of benzoylphosphine oxides, aryl ketones, benzophenones, hydroxylated ketones, 1-hydroxyphenyl ketones, ketals, metallocenes, and any combination thereof.

In an embodiment, the liquid radiation curable resin for additive fabrication includes at least one free-radical photoinitiator selected from the group consisting of 2,4,6-trimethylbenzoyl diphenylphosphine oxide and 2,4,6-trimethylbenzoyl phenyl, ethoxy phosphine oxide, bis(2,4,6-trimethylbenzoyl)-phenylphosphineoxide, 2-methyl-1-[4-(methylthio)phenyl]-2-morpholinopropanone-1,2-benzyl-2-(dimethylamino)-1-[4-(4-morpholinyl)phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis(diethylamino)benzophenone, and 4,4'-bis(N, N'-dimethylamino)benzophenone (Michler's ketone), benzophenone, 4-methyl benzophenone, 2,4,6-trimethyl benzophenone, dimethoxybenzophenone, 1-hydroxycyclohexyl phenyl ketone, phenyl (1-hydroxyisopropyl)ketone, 2-hydroxy-1-[4-(2-hydroxyethoxy)phenyl]-2-methyl-1-propanone, 4-isopropylphenyl(1-hydroxyisopropyl)ketone, oligo-[2-hydroxy-2-methyl-1-[4-(1-methylvinyl)phenyl] propanone], camphorquinone, 4,4'-bis(diethylamino)benzophenone, benzil dimethyl ketal, bis(eta 5-2-4-cyclopentadien-1-yl) bis[2,6-difluoro-3-(1H-pyrrol-1-yl)phenyl] titanium, and any combination thereof.

For light sources emitting in the 300-475 nm wavelength range, especially those emitting at 365 nm, 390 nm, or 395 nm, examples of suitable free-radical photoinitiators absorbing in this area include: benzoylphosphine oxides, such as, for example, 2,4,6-trimethylbenzoyl diphenylphosphine oxide (Lucirin TPO from BASF) and 2,4,6-trimethylbenzoyl phenyl, ethoxy phosphine oxide (Lucirin TPO-L from BASF), bis(2,4,6-trimethylbenzoyl)-phenylphosphineoxide (Irgacure 819 or BAPO from Ciba), 2-methyl-1-[4-(methylthio)phenyl]-2-morpholinopropanone-1 (Irgacure 907 from Ciba), 2-benzyl-2-(dimethylamino)-1-[4-(4-morpholinyl)phenyl]-1-butanone (Irgacure 369 from Ciba), 2-dimethylamino-2-(4-methyl-benzyl)-1-(4-morpholin-4-yl-phenyl)-butan-1-one (Irgacure 379 from Ciba), 4-benzoyl-4'-methyl diphenyl sulphide (Chivacure BMS from Chitec), 4,4'-bis(diethylamino)benzophenone (Chivacure EMK from Chitec), and 4,4'-bis(N,N'-dimethylamino)benzophenone (Michler's ketone). Also suitable are mixtures thereof.

Additionally, photosensitizers are useful in conjunction with photoinitiators in effecting cure with LED light sources emitting in this wavelength range. Examples of suitable photosensitizers include: anthraquinones, such as 2-methylanthraquinone, 2-ethylanthraquinone, 2-tertbutylanthraquinone, 1-chloroanthraquinone, and 2-amylanthraquinone, thioxanthones and xanthones, such as isopropyl thioxanthone, 2-chlorothioxanthone, 2,4-diethylthioxanthone, and 1-chloro-4-propoxythioxanthone, methyl benzoyl formate (Darocur MBF from Ciba), methyl-2-benzoyl benzoate (Chivacure OMB from Chitec), 4-benzoyl-4'-methyl diphenyl sulphide (Chivacure BMS from Chitec), 4,4'-bis(diethylamino)benzophenone (Chivacure EMK from Chitec).

It is possible for UV radiation sources to be designed to emit light at shorter wavelengths. For light sources emitting at wavelengths from between about 100 and about 300 nm, it is possible to employ a photosensitizer with a photoinitiator. When photosensitizers, such as those previously listed are present in the formulation, other photoinitiators absorbing at shorter wavelengths can be used. Examples of such photoinitiators include: benzophenones, such as benzophenone, 4-methyl benzophenone, 2,4,6-trimethyl benzophenone, dimethoxybenzophenone, and 1-hydroxyphenyl ketones, such as 1-hydroxycyclohexyl phenyl ketone, phenyl (1-hydroxyisopropyl)ketone, 2-hydroxy-1-[4-(2-hroxyethoxy)phenyl]-2-methyl-1-propanone, and 4-isopropylphenyl(1-hydroxyisopropyl)ketone, benzil dimethyl ketal, and oligo-[2-hydroxy-2-methyl-1-[4-(1-methylvinyl)phenyl] propanone] (Esacure KIP 150 from Lamberti).

Radiation sources can also be designed to emit at higher wavelengths. For radiation sources emitting light at wavelengths from about 475 nm to about 900 nm, examples of suitable free radical photoinitiators include: camphorquinone, 4,4'-bis(diethylamino)benzophenone (Chivacure EMK from Chitec), 4,4'-bis(N,N'-dimethylamino)benzophenone (Michler's ketone), bis(2,4,6-trimethylbenzoyl)-phenylphosphineoxide ("BAPO," or Irgacure 819 from Ciba), metallocenes such as bis (eta 5-2-4-cyclopentadien-1-yl) bis[2,6-difluoro-3-(1H-pyrrol-1-yl)phenyl]titanium (Irgacure 784 from Ciba), and the visible light photoinitiators from Spectra Group Limited, Inc. such as H-Nu 470, H-Nu-535, H-Nu-635, H-Nu-Blue-640, and H-Nu-Blue-660.

In one embodiment of the instant claimed invention, the light emitted by the radiation source is UVA radiation, which is radiation with a wavelength between about 320 and about 400 nm. In one embodiment of the instant claimed invention, the light emitted by the radiation source is UVB radiation, which is radiation with a wavelength between about 280 and about 320 nm. In one embodiment of the instant claimed invention, the light emitted by the radiation source is UVC radiation, which is radiation with a wavelength between about 100 and about 280 nm.

The liquid radiation curable resin for additive fabrication can include any suitable amount of the free-radical photoinitiator as component (d), for example, in certain embodiments, in an amount up to about 10 wt % of the resin composition, in certain embodiments, from about 0.1 to about 10 wt % of the resin composition, and in further embodiments from about 1 to about 6 wt % of the resin composition.

Presently, inventors have now surprisingly found that certain photoinitiating systems (i.e., specific selections of one or more cationic photoinitiators, photosensitizers, and/ or free radical photoinitiators) according to the present invention are able to exhibit excellent cure speed and efficiency of liquid radiation curable compositions for additive fabrication, all while minimizing the level of certain toxic substances contained therein. Specifically, such cure performance has therefore been achieved by relying on components which are substantially devoid of elemental antimony.

Stabilizers and Other Components

Stabilizers are often added to the resin compositions in order to further prevent a viscosity build-up, for instance a viscosity build-up during usage in a solid imaging process. Useful stabilizers include those described in, e.g., U.S. Pat. No. 5,665,792. In the instant claimed invention, the presence of a stabilizer is optional. In a specific embodiment, the liquid radiation curable resin composition for additive fabrication comprises from 0.1 wt % to 3% of a stabilizer.

If present, such stabilizers are usually hydrocarbon carboxylic acid salts of group IA and IIA metals. Most preferred examples of these salts are sodium bicarbonate, potassium bicarbonate, and rubidium carbonate. Solid stabilizers are generally not preferred in filled resin compositions. If present, a 15-23% sodium carbonate solution is preferred for formulations of this invention with recommended amounts varying between 0.05 to 3.0% by weight of resin composition, more preferably from 0.05 to 1.0 wt %, more preferably from 0.1 to 0.5% by weight of the resin composition. Alternative stabilizers include polyvinylpyrrolidones and polyacrylonitriles.

Other possible additives include silica-based and other fillers, dyes, pigments, antioxidants, wetting agents, photosensitizers for the free-radical photoinitiator, chain transfer agents, leveling agents, defoamers, surfactants and the like. Such components may be added in known amounts in accordance with their desired effect.

The liquid radiation curable resin composition for additive fabrication of the invention can further include one or more additives selected from the group consisting of bubble breakers, antioxidants, surfactants, acid scavengers, pigments, dyes, thickeners, flame retardants, silane coupling agents, resin particles, core-shell particle impact modifiers, soluble polymers and block polymers.

As noted previously herein, it is preferred that the liquid radiation curable compositions for additive fabrication according to the present invention possess a low initial viscosity in order to maximize workability and minimize processing time. Therefore, it is preferred that liquid radiation curable compositions for additive fabrication according to the present invention have a viscosity, when measured at 30 degrees Celsius, of less than 2000 cPs (if fillers are incorporated), more preferably less than 300 cPs, more preferably less than 200 cPs, more preferably less than 150 cPs.

Furthermore, liquid radiation curable compositions according to the present invention should be able to impart sufficient resilience and dimensional stability into the three dimensional solid objects which they form upon curing, even after exposure to water and/or high humidity conditions. Thus, it is preferred that the liquid radiation curable composition for additive fabrication according to the present invention possess water absorption values of less than 1%, more preferably less than 0.5%, most preferably less than 0.4%, when measured by ASTM D 0570-05, a method well-known to those of skill in the art to which this invention applies.

A second aspect of the claimed invention is an additive manufacturing process for forming a three-dimensional object comprising the steps of: forming and selectively curing a layer of the liquid radiation curable composition for additive fabrication according to a first aspect of the claimed invention with actinic radiation, and repeating the steps of forming and selectively curing a layer of the liquid radiation curable resin composition for additive fabrication according to a first aspect of the claimed invention a plurality of times to obtain a three-dimensional object.

A third aspect of the claimed invention is the three-dimensional object formed by the process of a second aspect of the claimed invention from the liquid radiation curable composition for additive fabrication according to a first aspect of the claimed invention.

Resins of the Present Invention Particularly Suitable in Investment Casting Applications A fourth aspect of the claimed invention is a method of using a component photocured via additive fabrication in an investment casting process, the method comprising the steps of arranging one or more components photocured via an additive fabrication process into a desired configuration to form a configuration pattern; coating said configuration pattern with a refractory material to create an investment; heating said investment sufficiently to burn off the configuration pattern, thereby forming an investment mold with at least one void; directing a molten material to flow into the void of the investment mold, thereby substantially filling said void; cooling the molten material, such that it crystallizes or solidifies; and removing said investment mold to create an investment casting part; wherein the one or more components contain, prior to photocuring via an additive fabrication process, a first antimony-free photoinitiator with an anion selected from the group consisting of $PF_6^-$, $BF_4^-$, $((CF_3)_2C_6H_3)_4B^-$, $(C_6F_5)_4Ga^-$, $((CF_3)_2C_6H_3)_4Ga^-$, trifluoromethanesulfonates, nonafluorobutanesulfonates, methanesulfonates, butanesulfonates, benzenesulfonates, p-toluenesulfonates, and $PF_\alpha(R_f)_\beta$, wherein $\alpha$ and $\beta$ are the same or different and are integers from 1-8, and $R_f$ contains a carbon atom and a halogen atom, and a cation of the following general formula I.

Formula I

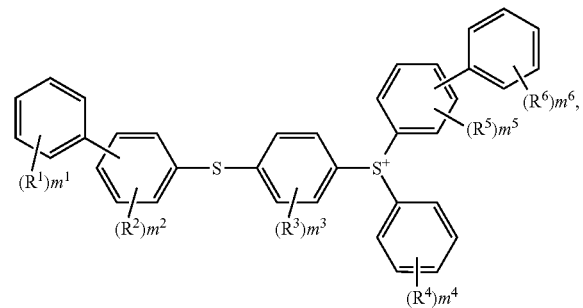

wherein $R^1$, $R^2$, $R^3$, $R^5$ and $R^6$ each independently represent an alkyl group, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, $R^4$ represents an alkyl group, a hydroxy group, an alkoxy group, an alkylcarbonyl group, an alkoxycarbonyl group, an acyloxy group, an alkylthio group, a heterocyclic hydrocarbon group, an alkylsulfinyl group, an alkylsulfonyl group, a hydroxy(poly)alkyleneoxy group, an optionally substituted amino group, a cyano group, a nitro group, or a halogen atom, $m^1$ to $m^6$ each represent the number of occurrences of each of $R^1$ to $R^6$, $m^1$, $m^4$, and $m^6$ each represent an integer of 0 to 5, and $m^2$, $m^3$, and $m^5$ each represent an integer of 0 to 4.

Investment casting processes are known generally, and historically have often required up to 8 or more high-level steps: master pattern production, moldmaking, pattern configuration, investment, dewax, burnout & preheating, pouring, and divesting. Brief, non-exhaustive descriptions of each step are provided below, along with a summary as to how the incorporation of liquid radiation curable compositions according to the present invention facilitate and streamline such processes.

The first traditional investment casting step is that of master pattern production. Here, a craftsman mold-maker fabricates a master pattern from wax, clay, wood, plastic, steel, or another suitable material according to any number of known (typically) subtractive processes.

Next, a mold or master die, is made from the master pattern. If the master pattern was fabricated from a material with a high melting point (such as steel, for example), then a low-melting-point metal or rubber might be cast directly from the master pattern.

The third step is that of wax pattern production. Although called a wax pattern, materials used and useful in this step include those with low melting or burn-out points, such as many plastics (especially thermoplastics) and mercury. Wax patterns may be produced in multiple ways. A first method involves repeatedly pouring the wax material into the master die in even repeated coating steps—so as to cover the inner surface of the master die in layers of roughly 3 mm successive increments—until the desired thickness is reached. Alternatively, the entire cavity of the master die might be filled in a single filling step, whereupon molten wax material is removed only after a desired thickness has set on the surface during the subsequent cooling process. Variations on these methods exist if a core is required, whereupon soluble wax or ceramic cores are typically additionally employed.

In another notable method, wax patterns may also be fashioned out of photocured polymeric materials created via additive fabrication processes from liquid radiation curable compositions according to the present invention. When such a type of wax pattern is used, it is referred to herein as a "component photocured via an additive fabrication process." Such components can be created by, for example, stereolithography processes as herein described and as well-known in the art.

Importantly, when components photocured via an additive fabrication process are utilized as the wax patterns, the first two steps of master pattern production and moldmaking are obviated, because the additive fabrication process itself creates the wax pattern directly. This is a more cost-effective option for many investment casting operations—particularly where a relatively shorter run of investment cast parts are required—because there is often a significant one-time cost associated with the master pattern production and/or mold-making step.

The fourth step (or the first step if pre-purchased or pre-made components photocured via an additive fabrication process are used) involves pattern configuration. Here, if wax patterns are used, they are removed from the mold. Depending on the application, multiple wax patterns may be created so that they can all be cast at once. This is easily alternatively accomplished when components photocured via an additive fabrication process are utilized, due to the inherently customizable nature of many such additive fabrication processes.

After component creation, the one or more wax patterns or components photocured via an additive fabrication process, as the case may be, are arranged into a configuration pattern in accordance with the desired configuration. The complexity of such configuration pattern is dependent upon the application and nature of the final parts to be investment cast. Components photocured via an additive fabrication process may be attached to a sprue, to form a pattern cluster, or tree; in an embodiment, as many as several hundred patterns may be assembled into a tree. Foundries often use registration marks to indicate precise locations and arrangements. Multiple trees may be utilized to form the desired configuration pattern. The components of the configuration pattern may also be chased and/or dressed, in order to remove any surface imperfections to maximize part accuracy, and to ensure the functional/aesthetic quality of the ultimate investment cast part.

The fifth step (or second step if pre-purchased or pre-made components photocured via an additive fabrication process are used) is called investment. In this step, a typically ceramic mold, known as an investment, may be produced by three repeating sub-steps: coating, stuccoing, and hardening. The first sub-step involves dipping the cluster into a slurry of fine refractory material and then letting any excess drain off, so as to impart a uniformly coated surface. A fine material is preferably used first to ensure a low surface finish and the reproduction of fine details. In the second sub-step, the cluster is often stuccoed with a coarser ceramic particle, by dipping it into a fluidised bed, placing it in a rainfall-sander, or by virtue of manual application. Finally, the coating is allowed to harden. These steps are repeated until the investment reaches the desired thickness, which is often anywhere from 5 to 15 mm, although other thicknesses may be employed.

Common, non-limiting refractory materials used to create the investments are: silica, zircon, various aluminium silicates, and alumina. Silica is usually used in its fused silica form, but quartz may also be used due to its typically lower cost. Aluminium silicates, which can also be used, are a mixture of alumina and silica. Commonly used mixtures have an alumina content from 42 to 72%. During the primary coat(s), zircon-based refractories are commonly used, because zirconium is less likely to react with the molten metal employed in the next step. A mixture of plaster and ground up old molds (known as chamotte) may also be used.

The binders used to hold the refractory material in place include: ethyl silicate (alcohol-based and chemically set), colloidal silica (water-based, also known as silica sol, set by drying), sodium silicate, and a hybrid of these controlled for pH and viscosity as desired according to methods known in the art.

It is critically important that the components photocured via an additive fabrication process possess dimensional stability during this process. Specifically, the tendency of three-dimensional components created via additive fabrication processes to resist water absorption during this process is important, due to water's known tendency to both deform the three dimensional part, along with the mechanical properties inherent in it. Therefore, in a preferred embodiment, the component photocured via an additive fabrication process possesses a water absorption value of less than 1%, more preferably less than 0.5%, most preferably less than 0.4%, when measured by ASTM D 0570-05, a method well-known to those of ordinary skill in the art to which this invention applies.

The next step is known as the dewax or heating step. In this step, the investment is allowed to completely thoroughly, a process which can take anywhere from 16 to 48 hours, depending on its geometry and the atmospheric conditions under which drying occurs. Drying can be enhanced by applying a vacuum or minimizing the environmental humidity. After drying the investment is turned upside-down and placed in a furnace or autoclave to melt out, burn out and/or vaporize the configuration pattern (be it comprised of wax components or components photocured via an additive fabrication process). Burn-out holes, also known as dewax ports, are often drilled before this step to facilitate the evacuation of the residue of the burned configuration pattern. When components photocured via an additive fabrication process are employed, the heating step may be conducted at temperatures of anywhere from 875 to 1500 degrees F. for a duration of 18-36 hours. Upon conclusion of this heating process, an investment mold with one or more voids is created (the voids corresponding to the areas where the configuration pattern previously existed).

Ideally, components photocured via an additive fabrication which are burned out during this step should yield a low ash content, or residue which remains in the voids of the investment, after this heating step. This ensures an easier cleaning process, and in turn a faster and more cost-effective investment casting process. In an embodiment, the components possess an ash content of less than 0.1%, more preferably less than 0.01%, most preferably less than 0.005%, relative to the weight of the component which existed before the heating step. Similarly, in a preferred embodiment, where multiple components are used to form a configuration pattern, said post-heated configuration pattern possess an ash content of less than 0.1%, more preferably less than 0.01%, most preferably less than 0.005%, relative to the entire weight of the configuration prior to the heating step.

The next step is called final burnout & preheating. The investment mold here may be subjected to another burnout, which heats such investment mold to between 870° C. and 1095° C. to remove any moisture and residual wax/component, and to sinter the investment mold. The mold is typically also preheated to enable the molten material (applied in the next step) to remain in a liquid state longer, so as to better ensure that it fills any fine details and voids, and also to increase dimensional accuracy.

The penultimate step involves pouring and cooling. Here, the investment mold is placed void-upwards into a tub filled with sand. Then a molten material is directed into said voids. This may be accomplished via gravity pouring, but if there are thin sections in the mold it may be filled by applying positive air pressure, vacuum cast, tilt cast, pressure assisted pouring, centrifugal cast, or other methods. The molten material is often a metal or a metal alloy. Any known metal or alloy may be used, so long as the heating/cooling parameters are set to account for the known material properties of the molten material being employed. After pouring, the molten material, along with the surrounding investment mold, is allowed to cool for a time sufficient to ensure that such molten material crystallizes and/or solidifies.

The final step is known as divesting. In this step, the investment mold is hammered, media blasted, vibrated, water-jetted, or chemically dissolved (sometimes with liquid nitrogen) to release the casting. The sprue is cut off and recycled. The casting may then be cleaned up to remove signs of the casting process, usually by grinding.

The following examples further illustrate the invention but, of course, should not be construed as in any way limiting its scope.

EXAMPLES

These examples illustrate embodiments of the liquid radiation curable composition for additive fabrication of the instant invention. Table 1 describes the various components of the liquid radiation curable composition for additive fabrication used in the present examples.

izable package, and in select instances (where noted) a photosensitizer. The specific compositions are reported in Table 2 below.

These samples were then tested according to the methods for conversion of the cycloaliphatic epoxide and oxetane components, as detailed below. The results are presented in Table 3 and FIGS. 1-4 below.

Cure Speed—FTIR Test

To measure polymerization rate (cure speed) of each example, a Real Time Fourier Transform Infrared (FTIR) spectroscopy was used. To increase the data acquisition frequency as well as resolution, a mercury cadmium telluride (MCT) detector was used. Instead of the transmission mode, the Attenuated Total Reflection (ATR) setup was used. All polymerization rate measurements were performed using the Thermo Scientific Nicolet 8700 model. The Table below shows the experimental conditions setup for the measurement. Under this condition, a total of 41 spectra for 200 seconds were obtained for each measurement:

| | |
|---|---|
| Number of scans | 4 |
| Resolution | 4 |
| Data collection type | Real Time |
| Profile type | Ramp |

TABLE 1

| Component | Function in Formula | Chemical Descriptor | Supplier/ Manufacturer |
|---|---|---|---|
| EPONOX 1510 | Cationically polymerizable component | Hydrogenated Bisphenol A digycydylether epoxy | EPM |
| OXT-101 | Cationically polymerizable component | 3-Hydroxymethy1-3-ethyloxetane | TOAGOSEI |
| Irgacure 184 | Radical Photoinitiator | 1-Hydroxy-1-cyclohexyl phenyl ketone | BASF |
| Ebecryl 3700 | Radically polymerizable component | Bisphenol A diglycidyl ether diacrylate | Allnex |
| Chivacure BMS | Photosensitizer | 4-Benzoyl-4'-methyl diphenyl sulphide | Chitech |
| CPI300PG | Antimony-free sulfonium salt cationic photoinitiator | 50% triarylsulfonium salt with fluoroalkyl-substituted fluorophosphate anion (CAS 108-65-6) + 50% propylene glycol momomethyl ether acrylate | SanApro |
| PAG-290 | Antimony-free sulfonium salt cationic photoinitiator | 20% triarylsulfonium salt with tetrakis(pentafluorophenyl)borate anion + 80% dispersant (solution of oxetane monomer and propylene carbonate) | BASF |
| Celloxide 2021P | Cationic Polymerizable Compound | 3,4-Epoxycyclohexylmethyl 3',4'-epoxycyclohexanecarboxylate | Daicel Corporation |
| CPTX | Photosensitizer | 1-chloro-4-propoxythioxanthone | Lambson |
| SR399 | Radically Polymerizable Compound | Dipentaerythritol pentaacrylate | Sartomer |
| SR-9003 | Radically Polymerizable Compound | Propoxylated neopentyl glycol diacrylate | Sartomer |

Examples 1-6

Various filled liquid radiation curable resins for additive fabrication were prepared according to well-known methods in the art, employing a hybrid cure photoinitiating package, a cationically polymerizable package, a radically polymer- -continued

| | |
|---|---|
| Time sequence | Save 200 seconds |
| Use repeat time (sec) | 5 |

For UV/Vis light control, a Digital Light Lab LED spot lamp (365 nm, 395 nm, and 400 nm) and controller (Accu- Cure Photo Rheometer) were used. Calibrated continuous mode was selected. Light intensity and duration (light exposure time) were selected before measurement.

For measurement, a couple of drops of selected sample are placed in the center of ATR crystal setup. Then, an approximately 3 mil film (±0.4 mils) was coated on the top of an ATR crystal using a 3 mil (±0.4 mils) draw down bird bar. Immediately after application of the 3 mil coating, the LED lamp was held on the top of ATR setup and positioned the hole at the center of the hold. Then the real time FTIR scan was initiated. Once 1 spectrum was obtained, the light source was turned on to start polymerization. Based on program input above, each spectrum was obtained every 5 seconds for a total of 200 seconds. A total of 41 spectra were obtained for each experiment.

Polymerization conversion versus time was calculated based on the specific IR peak change representing each functional group. An example of an IR peak change is shown in the picture above. To calculate the conversion for each relevant functional group, the peak height or peak area was calculated as appropriate according to the table below:

| Functional group | Method | Height or area (cm-1) | Baseline (cm-1) |
|---|---|---|---|
| Cycloaliphatic epoxy | Height | 787.791 | 856.253-778.149 |
| Oxetane | Area | 998.962-943.999 | 998.962-943.999 |

Figure 2:
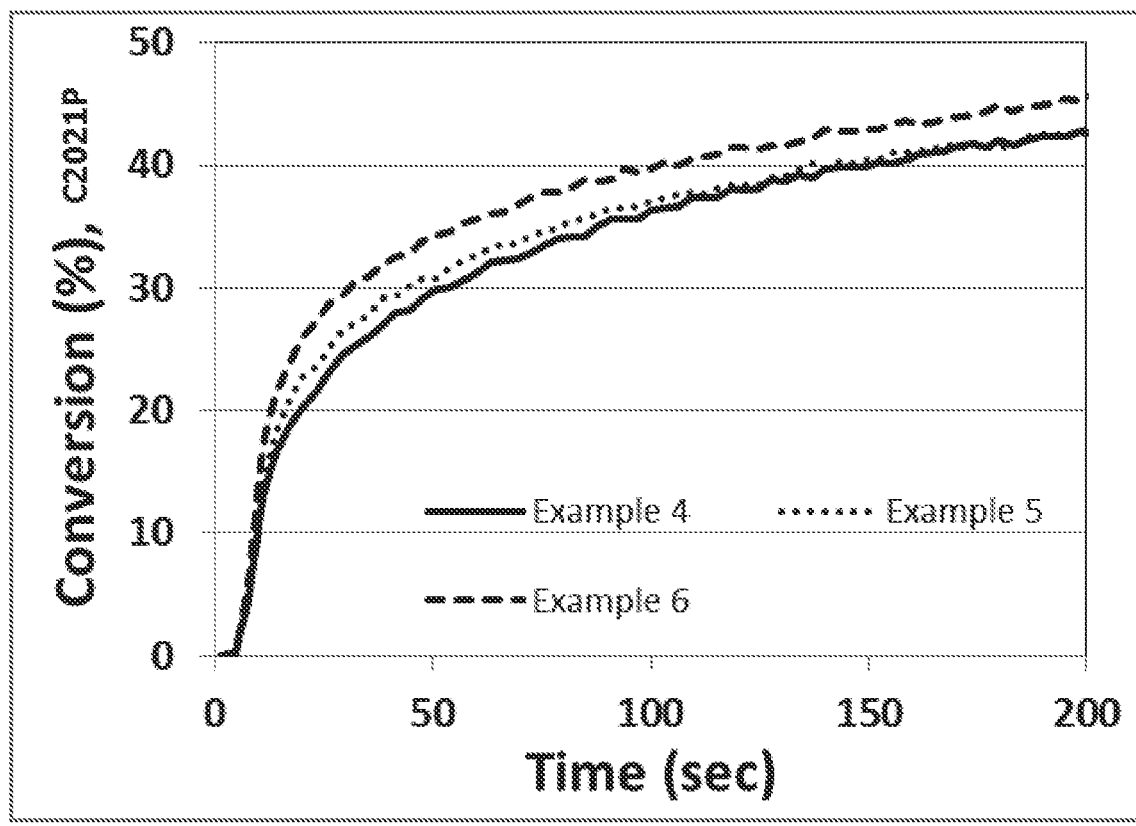
FIG. 2 is a plot depicting the RT-FTIR of the cycloaliphatic epoxide conversion of three liquid radiation curable compositions for additive fabrication which possess a different antimony-free, sulfonium salt cationic photoinitiator, with or without two different photosensitizers.
Figure 3:
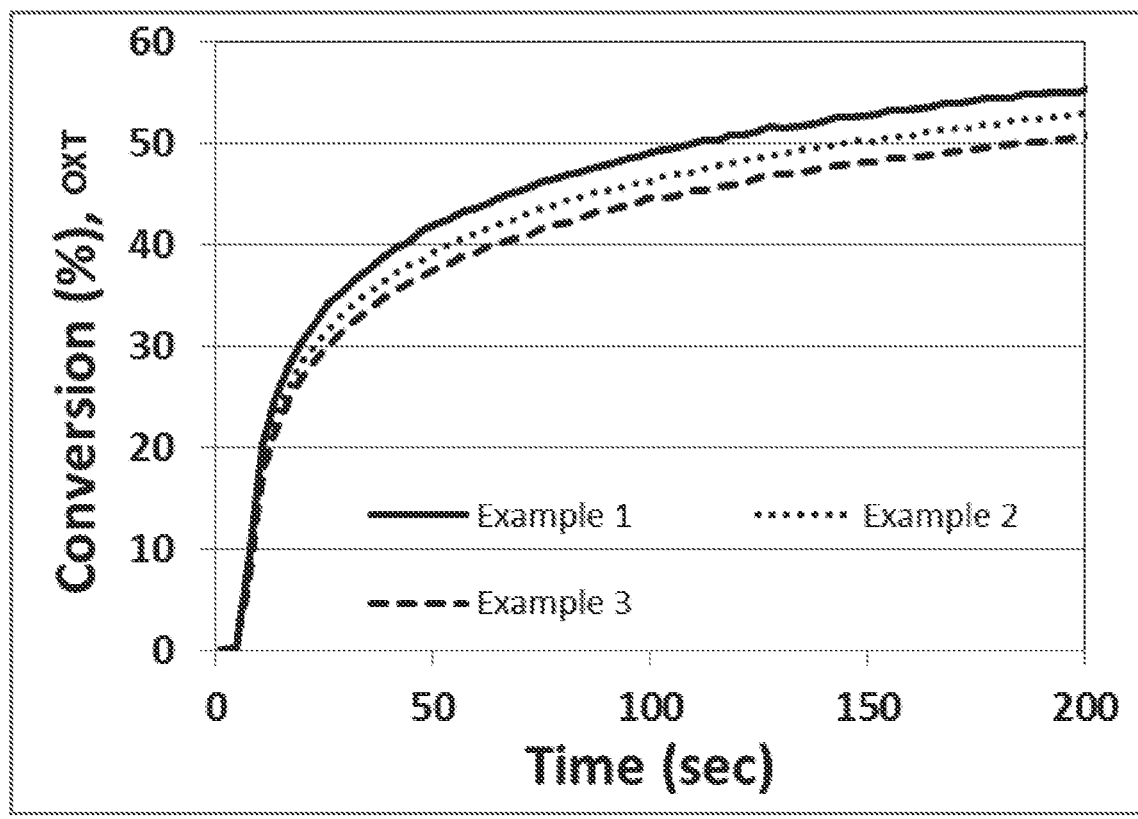
FIG. 3 is a plot depicting the RT-FTIR of the oxetane conversion of three liquid radiation curable compositions for additive fabrication which possess an antimony-free, sulfonium salt cationic photoinitiator, with or without two different photosensitizers.
Figure 4:
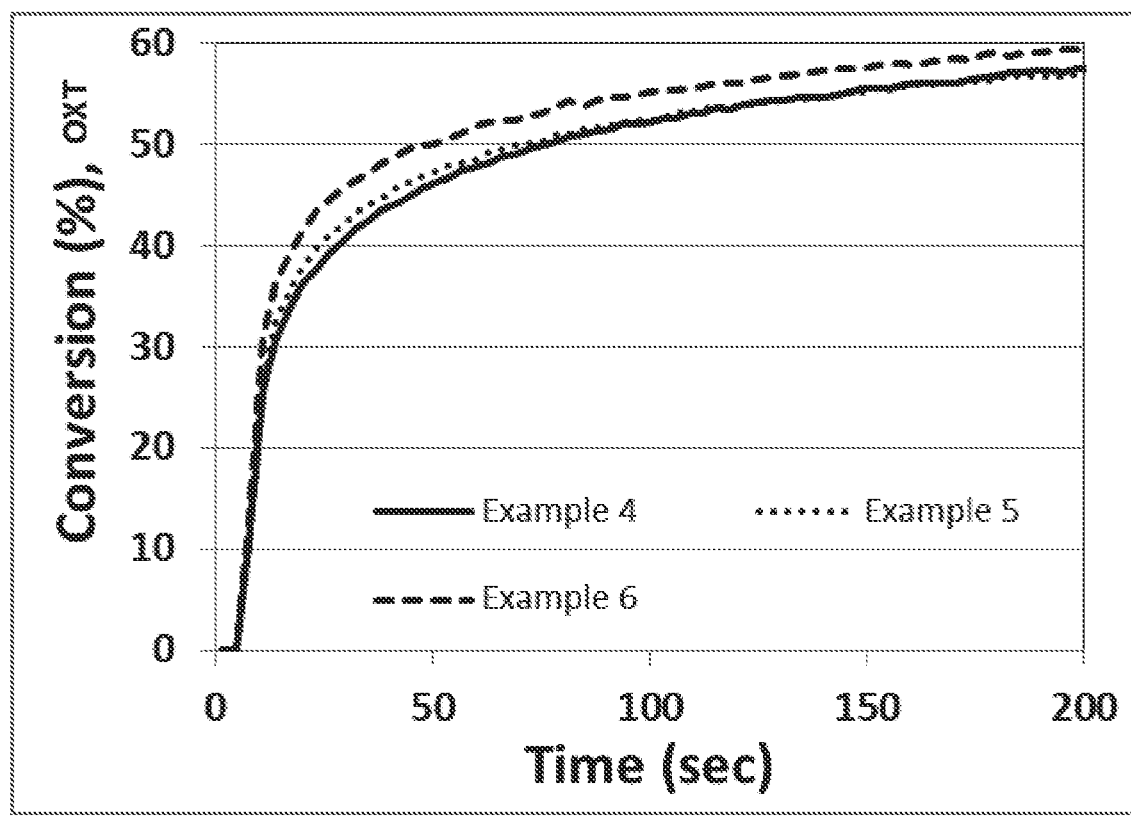
FIG. 4 is a plot depicting the RT-FTIR of the oxetane conversion of three liquid radiation curable compositions for additive fabrication which possess a different antimony-free, sulfonium salt cationic photoinitiator, with or without two different photosensitizers.

The results were plotted graphically and are depicted in FIGS. 1-4 below. The raw data appears in Table 3 below. FIGS. 1 and 2 represent the conversion plots for the cycloaliphatic epoxy component for compositions employing the PAG-290 and CPI-300PG antimony-free cationic photoinitiators, respectively. FIGS. 3 and 4 represent the conversion plots for the oxetane component for compositions employing the PAG-290 and CPI-300PG antimony-free cationic photoinitiators, respectively.

TABLE 2

Values are listed in parts by weight

| Component\Formula | Example 1 | Example 2 | Example 3 | Example 4 | Example 5 | Example 6 |
|---|---|---|---|---|---|---|
| Cationically polymerizable component-cycloaliphatic epoxy (Celloxide 2021P) | 40.44 | 40.40 | 40.38 | 41.78 | 41.73 | 41.71 |
| Cationically polymerizable component (OXT-101) | 18.20 | 18.18 | 18.17 | 18.80 | 18.78 | 18.77 |
| Cationically polymerizable component-other | 20.22 | 20.20 | 20.18 | 20.88 | 20.87 | 20.86 |
| Radically polymerizable component | 12.13 | 12.12 | 12.11 | 12.53 | 12.52 | 12.51 |
| PAG-290 | 5 | 5 | 5 | 0 | 0 | 0 |
| CPTX | 0 | 0.1 | 0 | 0 | 0.1 | 0 |
| BMS | 0 | 0 | 0.15 | 0 | 0 | 0.15 |
| CPI-300PG | 0 | 0 | 0 | 2 | 2 | 2 |
| Irgacure 184 | 4 | 4 | 4 | 4 | 4 | 4 |
| TOTAL | 100.00 | 100.00 | 100.00 | 100.00 | 100.00 | 100.00 |

TABLE 3

Raw Conversion Data of Celloxide 2021P (CAE) and OXT-101 (OXT), in % as a function of time (in seconds)

| | Example 1 | | Example 4 | | Example 2 | | Example 3 | | Example 5 | | Example 6 | |
|---|---|---|---|---|---|---|---|---|---|---|---|---|
| Time (s) | CAE | OXT | CAE | OXT | CAE | OXT | CAE | OXT | CAE | OXT | CAE | OXT |
| 1.570 | 0.0 | 0.0 | 0.0 | 0.0 | 0.0 | 0.0 | 0.0 | 0.0 | 0.0 | 0.0 | 0.0 | 0.0 |
| 7.719 | 3.9 | 8.3 | 4.6 | 10.6 | 3.6 | 8.5 | 3.1 | 6.5 | 4.8 | 9.9 | 5.9 | 12.6 |
| 13.867 | 12.8 | 24.8 | 16.4 | 30.6 | 11.7 | 23.2 | 10.5 | 21.5 | 18.1 | 32.4 | 21.2 | 36.3 |
| 20.016 | 16.8 | 30.5 | 20.2 | 36.3 | 15.0 | 28.5 | 14.2 | 26.9 | 22.7 | 37.8 | 25.9 | 41.3 |
| 26.164 | 19.2 | 34.3 | 23.1 | 39.3 | 17.4 | 31.7 | 16.1 | 30.1 | 25.1 | 41.0 | 28.7 | 44.5 |
| 32.313 | 21.3 | 36.5 | 25.4 | 41.6 | 19.2 | 34.4 | 18.2 | 32.5 | 27.2 | 43.2 | 30.6 | 46.4 |
| 38.462 | 23.2 | 38.7 | 27.0 | 43.6 | 21.1 | 36.3 | 19.5 | 34.7 | 29.1 | 44.7 | 31.9 | 48.3 |
| 50.759 | 25.9 | 42.0 | 30.0 | 46.3 | 23.6 | 39.4 | 22.2 | 37.7 | 30.8 | 47.3 | 34.2 | 50.1/// |
| 56.908 | 26.9 | 43.3 | 30.7 | 47.5 | 24.5 | 40.7 | 23.3 | 38.8 | 32.2 | 48.2 | 35.3 | 51.2 |
| 69.205 | 29.1 | 45.2 | 32.3 | 49.1 | 26.2 | 42.6 | 24.8 | 40.7 | 33.5 | 49.9 | 36.8 | 52.5 |
| 75.353 | 29.9 | 46.3 | 33.4 | 49.9 | 27.3 | 43.7 | 25.7 | 41.7 | 34.5 | 50.3 | 37.8 | 53.2 |
| 87.651 | 31.9 | 47.6 | 35.0 | 51.3 | 28.6 | 45.2 | 27.2 | 43.3 | 36.1 | 51.7 | 38.6 | 54.4 |
| 93.799 | 32.1 | 48.3 | 35.6 | 52.1 | 29.3 | 45.8 | 27.6 | 43.8 | 36.6 | 52.2 | 39.7 | 54.7 |
| 106.097 | 33.6 | 49.5 | 36.6 | 52.6 | 31.1 | 47.0 | 29.3 | 44.8 | 37.6 | 53.3 | 40.0 | 55.4 |
| 118.394 | 34.6 | 50.8 | 38.0 | 53.4 | 32.2 | 47.9 | 30.1 | 46.0 | 38.4 | 53.8 | 41.4 | 56.1 |
| 124.542 | 35.4 | 51.2 | 38.2 | 54.2 | 32.3 | 48.6 | 30.5 | 46.5 | 38.5 | 54.1 | 41.4 | 56.5 |
| 130.691 | 35.7 | 51.6 | 38.7 | 54.4 | 32.6 | 49.0 | 31.2 | 47.0 | 39.1 | 54.4 | 41.7 | 56.8 |

TABLE 3-continued

Raw Conversion Data of Celloxide 2021P (CAE) and OXT-101 (OXT), in % as a function of time (in seconds)

| Time (s) | Example 1 | | Example 4 | | Example 2 | | Example 3 | | Example 5 | | Example 6 | |
| --- | --- | --- | --- | --- | --- | --- | --- | --- | --- | --- | --- | --- |
| | CAE | OXT | CAE | OXT | CAE | OXT | CAE | OXT | CAE | OXT | CAE | OXT |
| 142.988 | 37.2 | 52.5 | 39.8 | 54.8 | 34.2 | 49.9 | 32.1 | 47.8 | 40.3 | 54.9 | 42.8 | 57.5 |
| 149.137 | 37.2 | 52.8 | 39.9 | 55.5 | 34.6 | 50.4 | 32.8 | 48.2 | 40.5 | 55.2 | 43.0 | 57.6 |
| 155.285 | 38.1 | 53.3 | 40.2 | 55.6 | 34.8 | 50.8 | 33.1 | 48.5 | 41.1 | 55.4 | 43.3 | 58.0 |
| 161.434 | 38.3 | 53.5 | 40.9 | 56.0 | 35.3 | 50.9 | 33.3 | 48.7 | 41.2 | 55.9 | 43.4 | 57.9 |
| 167.583 | 38.5 | 54.0 | 41.2 | 56.1 | 35.8 | 51.4 | 33.5 | 49.0 | 41.7 | 56.0 | 43.8 | 58.4 |
| 173.731 | 38.9 | 54.1 | 41.7 | 56.4 | 36.4 | 51.5 | 34.1 | 49.5 | 42.0 | 56.3 | 44.2 | 58.4 |
| 186.029 | 39.7 | 54.9 | 42.0 | 57.1 | 36.8 | 52.4 | 34.8 | 50.2 | 42.3 | 56.7 | 44.9 | 59.1 |
| 192.177 | 39.5 | 55.1 | 42.4 | 57.4 | 37.1 | 52.5 | 35.3 | 50.2 | 42.6 | 56.8 | 45.1 | 59.2 |
| 198.326 | 40.2 | 55.1 | 42.9 | 57.6 | 37.6 | 53.0 | 35.4 | 50.6 | 42.9 | 57.0 | 45.3 | 59.5 |

Discussion of Results

Examples 1-6 represent six different liquid radiation curable compositions possessing largely identical amounts of a cycloaliphatic epoxide component, an oxetane component, other cationically polymerizable components, free radically polymerizable components, and a free radical photoinitiator. They differ more significantly in the nature of the antimony-free cationic photoinitiator, along with (where applicable) the nature of the photosensitizer employed.

It is apparent from FIGS. 1 and 3 that when compositions possessing certain antimony-free sulfonium salt cationic photoinitiators (such as PAG-290) are coupled with photosensitizers designed for use with iodonium salt photoinitiators (CPTX, BMS), the rate of cure of a cycloaliphatic epoxide and oxetane is inhibited. In FIG. 1, for example, the % cure of the cycloaliphatic epoxide component decreases when a such an iodonium salt-compatible photosensitizer is used. Similarly, from FIG. 3 a similar trend is witnessed in the cure of the oxetane component of the composition. This was the expected result given the nature of the reagents used.

By contrast, when another antimony-free sulfonium salt according to the present invention (CPI-300PG) was employed as the cationic photoinitiator component, the conversion rates were actually accelerated when coupled with certain iodonium salt-compatible photosensitizers. First, the raw conversion even in the absence of a photosensitizer was slightly higher than versus the PAG-290 (assuming identical effective concentrations given the disparate amounts of dispersions in each product). Surprisingly, the addition of—and only the addition of—the BMS photosensitizer significantly accelerated and increased conversion than versus the employment of such cationic photoinitiator alone. This improvement was neither expected nor insignificant, as even modest improvements in conversion of the oxetane and cycloaliphatic epoxide components in a traditional hybrid cure composition for additive fabrication can yield an important increase in green strength, as well as an ability to cope with the higher processing speeds (or lower power) of the latest LED-based additive fabrication machines.

Additional Exemplary Embodiments

A first aspect of a first additional exemplary embodiment of the invention is a liquid radiation curable composition for additive fabrication comprising:

a cationically polymerizable component;
a radically polymerizable component;
an antimony-free cationic photoinitiator with
an anion selected from the group consisting of $PF_6^-$, $BF_4^-$, $((CF_3)_2C_6H_3)_4B^-$, $(C_6F_5)_4Ga^-$, $((CF_3)_2C_6H_3)_4Ga^-$, trifluoromethanesulfonates, nonafluorobutanesulfonates, methanesulfonates, butanesulfonates, benzenesulfonates, p-toluenesulfonates, and $PF_\alpha(R_f)_\beta$, wherein $\alpha$ and $\beta$ are the same or different, and are integers from 1-8, and $R_f$ contains a carbon atom and a halogen atom, and
a cation of the following general formula:

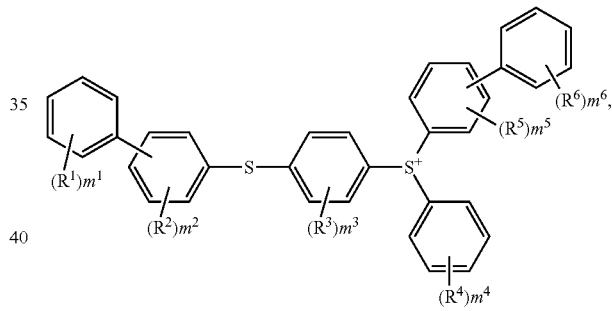

wherein $R^1$, $R^2$, $R^3$, $R^5$ and $R^6$ each independently represent an alkyl group, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, $R^4$ represents an alkyl group, a hydroxy group, an alkoxy group, an alkylcarbonyl group, an alkoxycarbonyl group, an acyloxy group, an alkylthio group, a heterocyclic hydrocarbon group, an alkylsulfinyl group, an alkylsulfonyl group, a hydroxy(poly)alkyleneoxy group, an optionally substituted amino group, a cyano group, a nitro group, or a halogen atom, $m^1$ to $m^6$ each represent the number of occurrences of each of $R^1$ to $R^6$, $m^1$, $m^4$, and $m^6$ each represent an integer of 0 to 5, and $m^2$, $m^3$, and $m^5$ each represent an integer of 0 to 4;

a photosensitizer possessing the following structure:

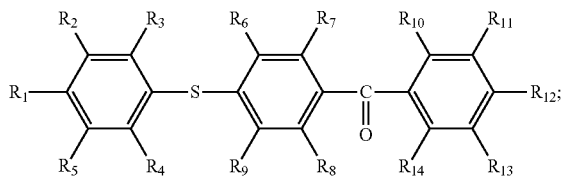

wherein $R_1$-$R_{14}$ are independently H or a $C_1$-$C_8$ saturated or unsaturated, branched or unbranched, substituted, or unsubstituted hydrocarbyl; and a free-radical photoinitiator.

An additional aspect of a first additional exemplary embodiment of the invention is a liquid radiation curable composition for additive fabrication of any of the previous aspects of the first exemplary embodiment of the invention, wherein the anion of the cationic photoinitiator is a fluoroalkyl-substituted fluorophosphate.

An additional aspect of a first additional exemplary embodiment of the invention is a liquid radiation curable composition for additive fabrication of any of the previous aspects of the first exemplary embodiment of the invention, wherein the anion of the cationic photoinitiator is $(CF_3CF_2)_3PF_3^-$.

An additional aspect of a first additional exemplary embodiment of the invention is a liquid radiation curable composition for additive fabrication of any of the previous aspects of the first exemplary embodiment of the invention, wherein the cationically polymerizable component contains an aliphatic epoxide selected from the group consisting of: 3,4-epoxycyclohexylmethyl-3',4'-epoxycyclohexanecarboxylate, 2-(3,4-epoxycyclohexyl-5,5-spiro-3,4-epoxy)-cyclohexane-1,4-dioxane, bis(3,4-epoxycyclohexylmethyl) adipate, vinylcyclohexene oxide, 4-vinylepoxycyclohexane, vinylcyclohexene dioxide, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexane carboxylates, trimethylcaprolactone-modified 3,4-epoxycyclohexylmethyl-3',4'-epoxycyclohexane carboxylates, β-methyl-δ-valerolactone-modified 3,4-epoxycyclohexylmethyl-3',4'-epoxycyclohexane carboxylates, methylenebis(3,4-epoxycyclohexane), bicyclohexyl-3,3'-epoxide, bis(3,4-epoxycyclohexyl) with a linkage of —O—, —S—, —SO—, —SO$_2$—, —C(CH$_3$)$_2$—, —CBr$_2$—, —C(CBr$_3$)$_2$—, —C(CF$_3$)$_2$—, —(CCl$_3$)$_2$—, or —CH (C$_6$H$_5$)—, dicyclopentadiene diepoxide, di(3,4-epoxycyclohexylmethyl) ether of ethylene glycol, ethylenebis(3,4-epoxycyclohexanecarboxylate), and epoxyhexahydrodioctylphthalate.

An additional aspect of a first additional exemplary embodiment of the invention is a liquid radiation curable composition for additive fabrication of any of the previous aspects of the first exemplary embodiment of the invention, further comprising a UV absorber.

An additional aspect of a first additional exemplary embodiment of the invention is a liquid radiation curable composition for additive fabrication of any of the previous aspects of the first exemplary embodiment of the invention, wherein the UV absorber comprises one or more compounds selected from the group consisting of cinnamate derivatives, salicylate derivatives, benzophenone derivatives, camphor derivatives, and dibenzoyl methane derivatives, and any combinations thereof.

An additional aspect of a first additional exemplary embodiment of the invention is a liquid radiation curable composition for additive fabrication of any of the previous aspects of the first exemplary embodiment of the invention, wherein the UV absorber comprises a benzophenone derivative of the following structure:

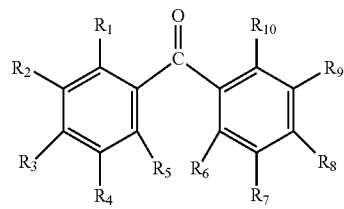

wherein $R_1$ to $R_{10}$ are the same or different, and represent a hydroxyl group, hydrogen atom or a $C_1$-$C_8$ saturated or unsaturated, branched or unbranched, substituted, or unsubstituted hydrocarbyl substituent, further wherein at least one of $R_1$, $R_5$, $R_6$, or $R_{10}$ is a hydroxyl group.

An additional aspect of a first additional exemplary embodiment of the invention is a liquid radiation curable composition for additive fabrication of any of the previous aspects of the first exemplary embodiment of the invention, wherein the ratio by weight of the cationic photoinitiator to the photosensitizer is from 2:1 to 100:1, more preferably from 5:1 to 50:1, more preferably from 10:1 to 15:1.

An additional aspect of a first additional exemplary embodiment of the invention is a liquid radiation curable composition for additive fabrication of any of the previous aspects of the first exemplary embodiment of the invention, wherein the viscosity at 200 Celsius is less than 300 cPs, more preferably less than 200 cPs, more preferably less than 150 cPs.

An additional aspect of a first additional exemplary embodiment of the invention is a liquid radiation curable composition for additive fabrication of any of the previous aspects of the first exemplary embodiment of the invention, wherein, relative to the total weight of the entire composition:
  the cationically polymerizable component is present in an amount of from about 30 wt % to about 85 wt %, more preferably 35 wt % to 75 wt %;
  the radically polymerizable component is present in an amount of from about 5 wt % to about 50 wt %; more preferably from about 10 wt % to about 40 wt % the cationic photoinitiator is present in an amount of from about 1 wt % to about 10 wt %; more preferably from about 1 wt % to about 5 wt %;
  the photosensitizer is present in an amount of from about 0.05 wt % to about 3 wt %; more preferably from about 0.2 wt % to about 2 wt %; and
  the free radical photoinitiator is present in an amount of from about 0.1 wt % to about 10 wt %; more preferably from about 1 wt % to about 3 wt %.

An additional aspect of a first additional exemplary embodiment of the invention is a liquid radiation curable composition for additive fabrication of any of the previous aspects of the first exemplary embodiment of the invention, wherein the cationic photoinitiator is substantially devoid of any iodonium salt.

An additional aspect of a first additional exemplary embodiment of the invention is a liquid radiation curable composition for additive fabrication of any of the previous aspects of the first exemplary embodiment of the invention, wherein the cationically polymerizable component also includes a hydrogenated bisphenol A digycydylether epoxy.

An additional aspect of a first additional exemplary embodiment of the invention is a liquid radiation curable composition for additive fabrication of any of the previous aspects of the first exemplary embodiment of the invention, wherein the cationically polymerizable component also includes an oxetane.

An additional aspect of a first additional exemplary embodiment of the invention is a liquid radiation curable composition for additive fabrication of any of the previous aspects of the first exemplary embodiment of the invention, wherein the entire composition is substantially devoid of any elemental antimony.

An additional aspect of a first additional exemplary embodiment of the invention is a liquid radiation curable composition for additive fabrication of any of the previous aspects of the first exemplary embodiment of the invention, wherein the photosensitizer is 4-benzoyl-4'-methyl diphenyl sulphide.

An additional aspect of a first additional exemplary embodiment of the invention is an additive manufacturing process for forming a three-dimensional object comprising the steps of: forming and selectively curing a layer of the liquid radiation curable resin composition for additive fabrication of any of the previous aspects of the first exemplary embodiment of the invention with actinic radiation, and repeating the steps of forming and selectively curing a layer of said liquid radiation curable resin composition a plurality of times to obtain a three-dimensional object.

An additional aspect of a first additional exemplary embodiment of the invention is the process of the previous aspect of the first exemplary embodiment of the invention, wherein the source of actinic radiation is one or more LEDs emitting a wavelength of from 340 nm-415 nm, preferably having a peak at about 365 nm.

An additional aspect of a first additional exemplary embodiment of the invention is a three-dimensional object formed by the process of either of the previous two aspects of the first additional exemplary embodiment of the invention.

An additional aspect of a first additional exemplary embodiment of the invention is the three-dimensional object of the previous aspect of the first additional exemplary embodiment of the invention, wherein said three-dimensional object possesses a water absorption value of less than 1%, more preferably less than 0.5%, most preferably less than 0.4%.

A first aspect of a second additional exemplary embodiment of the invention is a method of using a component photocured via additive fabrication in an investment casting process, the method comprising the steps of:
(a) arranging one or more components photocured via an additive fabrication process into a desired configuration to form a configuration pattern;
(b) coating said configuration pattern with a refractory material to create an investment;
(c) heating said investment sufficiently to burn off the configuration pattern, thereby forming an investment mold with at least one void;
(d) directing a molten material to flow into the void of the investment mold, thereby filling said void;
(e) cooling the molten material, such that it crystallizes or solidifies; and
(f) removing said investment mold to create an investment casting; wherein the one or more components contain, prior to photocuring via an additive fabrication process, a first antimony-free photoinitiator with
an anion selected from the group consisting of $PF_6^-$, $BF_4^-$, $((CF_3)_2C_6H_3)_4B^-$, $(C_6F_5)_4Ga^-$, $((CF_3)_2C_6H_3)_4Ga^-$, trifluoromethanesulfonates, nonafluorobutanesulfonates, methanesulfonates, butanesulfonates, benzenesulfonates, p-toluenesulfonates, and $PF_\alpha(R_f)_\beta$, wherein $\alpha$ and $\beta$ are the same or different and are integers from 1-8, and $R_f$ contains a carbon atom and a halogen atom, and
a cation of the following general formula:

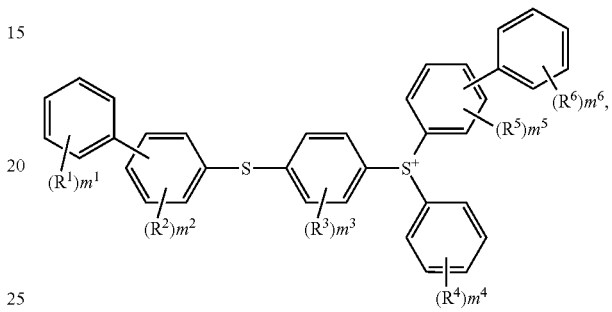

wherein $R^1$, $R^2$, $R^3$, $R^5$ and $R^6$ each independently represent an alkyl group, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, $R^4$ represents an alkyl group, a hydroxy group, an alkoxy group, an alkylcarbonyl group, an alkoxycarbonyl group, an acyloxy group, an alkylthio group, a heterocyclic hydrocarbon group, an alkylsulfinyl group, an alkylsulfonyl group, a hydroxy(poly)alkyleneoxy group, an optionally substituted amino group, a cyano group, a nitro group, or a halogen atom, $m^1$ to $m^6$ each represent the number of occurrences of each of $R^1$ to $R^6$, $m^1$, $m^4$, and $m^6$ each represent an integer of 0 to 5, and $m^2$, $m^3$, and $m^5$ each represent an integer of 0 to 4.

An additional aspect of a second additional exemplary embodiment of the invention is a method according to any of the previous aspects of the second additional exemplary embodiment of the invention, wherein the one or more components additionally contain, prior to photocuring via an additive fabrication process, an antimony-free photosensitizer, said antimony-free photosensitizer possessing the following structure:

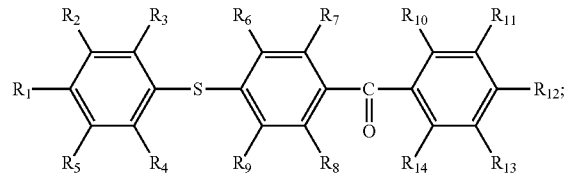

wherein $R_1$-$R_{14}$ are independently H or a $C_1$-$C_8$ saturated or unsaturated, branched or unbranched, substituted, or unsubstituted hydrocarbyl.

An additional aspect of a second additional exemplary embodiment of the invention is a method according to any of the previous aspects of the second additional exemplary embodiment of the invention, wherein the one or more components further optionally comprises, prior to photocuring via an additive fabrication process, a hydroxy-substituted benzophenone compound.

An additional aspect of a second additional exemplary embodiment of the invention is a method according to any of the previous aspects of the second additional exemplary embodiments of the invention, wherein the benzophenone compound is a UV absorber.

An additional aspect of a second additional exemplary embodiment of the invention is a method according to any of the previous aspects of the second additional exemplary embodiment of the invention, wherein the benzophenone compound comprises 2-hydroxy-4-methoxybenzophenone, 2,4-dihydroxybenzophenone, or 2-hydroxy-4-n-octoxybenzophenone.

An additional aspect of a second additional exemplary embodiment of the invention is a method according to any of the previous aspects of the second additional exemplary embodiment of the invention, wherein the molten material is a metal or metal alloy.

An additional aspect of a second additional exemplary embodiment of the invention is a method according to any of the previous aspects of the second additional exemplary embodiment of the invention, wherein the refractory material is a ceramic.

An additional aspect of a second additional exemplary embodiment of the invention is a method according to any of the previous aspects of the second additional exemplary embodiment of the invention, wherein the one or more components possess an ash content, after the heating step, of less than 0.1%, more preferably less than 0.01%, most preferably less than 0.005%.

An additional aspect of a second additional exemplary embodiment of the invention is a method according to any of the previous aspects of the second additional exemplary embodiment of the invention, wherein the configuration pattern, after the heating step wherein the configuration has been burned off, possesses an ash content of less than 0.1%, more preferably less than 0.01%, most preferably less than 0.005%.

An additional aspect of a second additional exemplary embodiment of the invention is a method according to any of the previous aspects of the second additional exemplary embodiment of the invention, wherein the first antimony-free photoinitiator is a is a fluoroalkyl-substituted fluorophosphate.

An additional aspect of a second additional exemplary embodiment of the invention is a method according to any of the previous aspects of the second additional exemplary embodiment of the invention, wherein the anion of the first antimony-free cationic photoinitiator is $(CF_3CF_2)_3PF_3^-$.

An additional aspect of a second additional exemplary embodiment of the invention is a method according to any of the previous aspects of the second additional exemplary embodiment of the invention, wherein the antimony-free photosensitizer is 4-benzoyl-4'-methyl diphenyl sulphide.

An additional aspect of a second additional exemplary embodiment of the invention is a method according to any of the previous aspects of the second additional exemplary embodiment of the invention, wherein the one or more components photocured via an additive fabrication process possess a water absorption value of less than 1%, more preferably less than 0.5%, most preferably less than 0.4%.

An additional aspect of a second additional exemplary embodiment of the invention is an investment casting made from any of the methods according to any of the previous aspects of the second additional exemplary embodiment of the invention.

A first aspect of a third additional exemplary embodiment of the invention is a radiation curable composition for additive fabrication comprising, relative to the weight of the entire composition:
  from about 40 wt % to about 90 wt % of a cationically polymerizable component comprising at least one cationically polymerizable compound;
  from about 8 wt % to about 50 wt % of a radically polymerizable component comprising at least one radically polymerizable compound;
  from about 1 wt % to about 8 wt % of a cationic photoinitiator component comprising at least one cationic photoinitiator;
  optionally, from about 0.01 wt % to about 5 wt % of a photosensitizer component comprising at least one photosensitizer;
  from about 0.05 wt % to about 3 wt % of a UV absorber component comprising at least one UV absorber; and
  from about 0.1 wt % to about 10 wt % of a free-radical photoinitiator component comprising at least one free-radical photoinitiator;
  wherein the cationic photoinitiator component is substantially devoid of elemental antimony.

An additional aspect of a third additional exemplary embodiment of the invention is a radiation curable composition for additive fabrication according to any of the previous aspects of the third additional exemplary embodiment of the invention, wherein the one or more components photocured via an additive fabrication process possess a water absorption value of less than 1%, more preferably less than 0.5%, most preferably less than 0.4%.

An additional aspect of a third additional exemplary embodiment of the invention is a radiation curable composition for additive fabrication according to any of the previous aspects of the third additional exemplary embodiment of the invention, wherein the UV absorber component comprises a cinnamate derivative, a salicylate derivative, a benzophenone derivative, a camphor derivative, a dibenzoyl methane derivative, or any combination thereof.

An additional aspect of a third additional exemplary embodiment of the invention is a radiation curable composition for additive fabrication according to any of the previous aspects of the third additional exemplary embodiment of the invention, wherein the UV absorber component comprises a benzophenone derivative of the following structure:

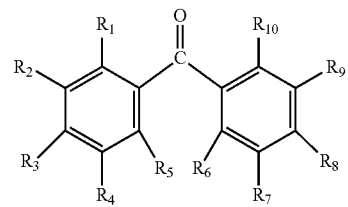

wherein $R_1$ to $R_{10}$ are the same or different, and represent a hydroxyl group, hydrogen atom or a $C_1$-$C_8$ saturated or unsaturated, branched or unbranched, substituted, or unsubstituted hydrocarbyl substituent, further wherein at least one of $R_1$, $R_5$, $R_6$, or $R_{10}$ is a hydroxyl group.

An additional aspect of a third additional exemplary embodiment of the invention is a radiation curable composition for additive fabrication according to any of the previous aspects of the third additional exemplary embodiment of the invention, wherein the UV absorber component is selected from the group consisting of 2-hydroxy-4-methoxybenzophenone, 2,4-dihydroxybenzophenone, and 2-hydroxy-4-n-octoxybenzophenone.

An additional aspect of a third additional exemplary embodiment of the invention is a radiation curable composition for additive fabrication according to any of the previous aspects of the third additional exemplary embodiment of the invention, wherein the anion of the cationic photoinitiator is a fluoroalkyl-substituted fluorophosphate.

An additional aspect of a third additional exemplary embodiment of the invention is a radiation curable composition for additive fabrication according to any of the previous aspects of the third additional exemplary embodiment of the invention, wherein the anion of the cationic photoinitiator is $(CF_3CF_2)_3PF_3^-$.

An additional aspect of a third additional exemplary embodiment of the invention is a radiation curable composition for additive fabrication according to any of the previous aspects of the third additional exemplary embodiment of the invention, wherein the cationically polymerizable component contains an aliphatic epoxide selected from the group consisting of: 3,4-epoxycyclohexylmethyl-3',4'-epoxycyclohexanecarboxylate, 2-(3,4-epoxycyclohexyl-5,5-spiro-3,4-epoxy)-cyclohexane-1,4-dioxane, bis(3,4-epoxycyclohexylmethyl)adipate, vinylcyclohexene oxide, 4-vinylepoxycyclohexane, vinylcyclohexene dioxide, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexane carboxylates, trimethylcaprolactone-modified 3,4-epoxycyclohexylmethyl-3',4'-epoxycyclohexane carboxylates, β-methyl-δ-valerolactone-modified 3,4-epoxycyclohexcylmethyl-3',4'-epoxycyclohexane carboxylates, methylenebis(3,4-epoxycyclohexane), bicyclohexyl-3,3'-epoxide, bis(3,4-epoxycyclohexyl) with a linkage of —O—, —S—, —SO—, —SO$_2$—, —C(CH$_3$)$_2$—, —CBr$_2$—, —C(CBr$_3$)$_2$—, —C(CF$_3$)$_2$—, —(CCl$_3$)$_2$—, or —CH(C$_6$H$_5$)—, dicyclopentadiene diepoxide, di(3,4-epoxycyclohexylmethyl) ether of ethylene glycol, ethylenebis(3,4-epoxycyclohexanecarboxylate), and epoxyhexahydrodioctylphthalate.

An additional aspect of a third additional exemplary embodiment of the invention is a radiation curable composition for additive fabrication according to any of the previous aspects of the third additional exemplary embodiment of the invention, wherein the cationic photoinitiator component comprises a cationic photoinitiator with an anion selected from the group consisting of $PF_6^-$, $BF_4^-$, $((CF_3)_2 C_6H_3)_4B^-$, $(C_6F_5)_4Ga^-$, $((CF_3)_2C_6H_3)_4Ga^-$, trifluoromethanesulfonates, nonafluorobutanesulfonates, methanesulfonates, butanesulfonates, benzenesulfonates, p-toluenesulfonates, and $PF_\alpha(R_f)_\beta$, wherein α and β are the same or different, and are integers from 1-8, and $R_f$ contains a carbon atom and a halogen atom.

An additional aspect of a third additional exemplary embodiment of the invention is a radiation curable composition for additive fabrication according to any of the previous aspects of the third additional exemplary embodiment of the invention, wherein the cationic photoinitiator component comprises a cationic photoinitiator with a cation according to the following general formula:

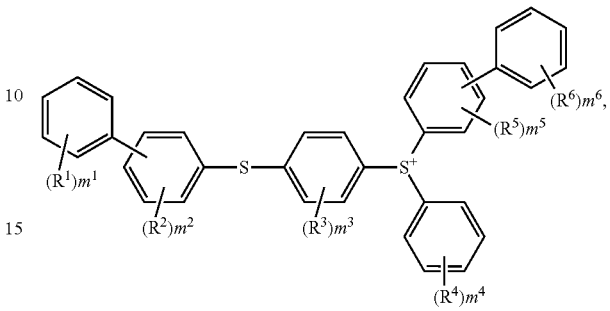

wherein $R^1$, $R^2$, $R^3$, $R^5$ and $R^6$ each independently represent an alkyl group, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, $R^4$ represents an alkyl group, a hydroxy group, an alkoxy group, an alkylcarbonyl group, an alkoxycarbonyl group, an acyloxy group, an alkylthio group, a heterocyclic hydrocarbon group, an alkylsulfinyl group, an alkylsulfonyl group, a hydroxy(poly)alkyleneoxy group, an optionally substituted amino group, a cyano group, a nitro group, or a halogen atom, $m^1$ to $m^6$ each represent the number of occurrences of each of $R^1$ to $R^6$, $m^1$, $m^4$, and $m^6$ each represent an integer of 0 to 5, and $m^2$, $m^3$, and $m^5$ each represent an integer of 0 to 4;

An additional aspect of a third additional exemplary embodiment of the invention is a radiation curable composition for additive fabrication according to any of the previous aspects of the third additional exemplary embodiment of the invention, wherein the photosensitizer comprises a compound according to the following structure

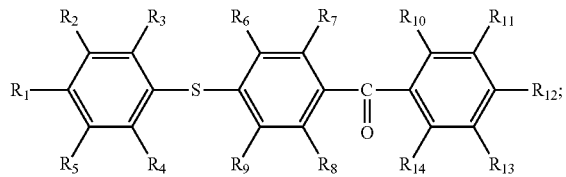

wherein $R_1$-$R_{14}$ are independently H or a $C_1$-$C_8$ saturated or unsaturated, branched or unbranched, substituted, or unsubstituted hydrocarbyl substituent.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A liquid radiation curable composition for additive fabrication comprising:
    a cationically polymerizable component;
    a radically polymerizable component;
    an antimony-free cationic photoinitiator with an anion selected from the group consisting of $PF_6^-$, $BF_4^-$, $((CF_3)_2C_6H_3)_4B^-$, $(C_6F_5)_4Ga^-$, $((CF_3)_2C_6H_3)_4Ga^-$, trifluoromethanesulfonates, nonafluorobutanesulfonates, methanesulfonates, butanesulfonates, benzenesulfonates, p-toluenesulfonates, and $PF_\alpha(R_f)_\beta$, wherein $\alpha$ and $\beta$ are the same or different, and are integers from 1-8, and $R_f$ contains a carbon atom and a halogen atom, and
    a cation of the following general formula:

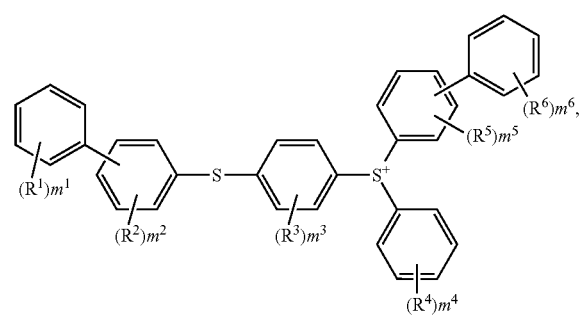

wherein $R^1$, $R^2$, $R^3$, $R^5$ and $R^6$ each independently represent an alkyl group, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, $R^4$ represents an alkyl group, a hydroxy group, an alkoxy group, an alkylcarbonyl group, an alkoxycarbonyl group, an acyloxy group, an alkylthio group, a heterocyclic hydrocarbon group, an alkylsulfinyl group, an alkylsulfonyl group, a hydroxy(poly)alkyleneoxy group, an optionally substituted amino group, a cyano group, a nitro group, or a halogen atom, $m^1$ to $m^6$ each represent the number of occurrences of each of $R^1$ to $R^6$, $m^1$, $m^4$, and $m^6$ each represent an integer of 0 to 5, and $m^2$, $m^3$, and $m^5$ each represent an integer of 0 to 4; and a photosensitizer possessing the following structure:

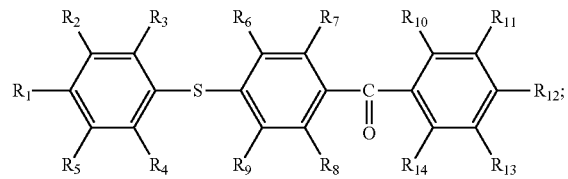

wherein $R^1$-$R^{14}$ are independently H or a $C_1$-$C_8$ saturated or unsaturated, branched or unbranched, substituted, or unsubstituted hydrocarbyl;
    a free-radical photoinitiator; and
    a UV absorber;
    wherein the UV absorber comprises one or more compounds selected from the group consisting of cinnamate derivatives, salicylate derivatives, benzophenone derivatives, camphor derivatives, and dibenzoyl methane derivatives, and any combinations thereof.

2. The liquid radiation curable composition for additive fabrication of claim 1, wherein the anion of the cationic photoinitiator is a fluoroalkyl-substituted fluorophosphate.

3. The liquid radiation curable composition for additive fabrication of claim 1, wherein the anion of the cationic photoinitiator is $(CF_3CF_2)_3PF_3^-$.

4. The liquid radiation curable composition for additive fabrication of claim 1, wherein the ratio by weight of the cationic photoinitiator to the photosensitizer is from 2:1 to 100:1.

5. The liquid radiation curable composition for additive fabrication of claim 1, wherein the viscosity at 20° Celsius is less than 300 cPs.

6. The liquid radiation curable composition for additive fabrication of claim 1, wherein, relative to the total weight of the entire composition:
    the cationically polymerizable component is present in an amount of from about 30 wt % to about 85 wt %;
    the radically polymerizable component is present in an amount of from about 5 wt % to about 50 wt %;
    the cationic photoinitiator is present in an amount of from about 1 wt % to about 10 wt %;
    the photosensitizer is present in an amount of from about 0.05 wt % to about 3 wt %;
    the free radical photoinitiator is present in an amount of from about 0.1 wt % to about 10 wt %; and the UV absorber is present in an amount of from 0.05 wt % to about 3 wt %.

7. The liquid radiation curable composition for additive fabrication of claim 1, wherein the cationic photoinitiator is substantially devoid of any iodonium salt.

8. The liquid radiation curable composition of claim 1, wherein the entire composition is substantially devoid of any elemental antimony.

9. The liquid radiation curable composition of claim 1, wherein the photosensitizer is 4-benzoyl-4'-methyl di phenyl sulphide.

10. An additive manufacturing process for forming a three-dimensional object comprising the steps of: forming and selectively curing a layer of the liquid radiation curable resin composition for additive fabrication of claim 1 with actinic radiation, and repeating the steps of forming and selectively curing a layer of the liquid radiation curable resin composition for additive fabrication of claim 1 a plurality of times to obtain a three-dimensional object.

11. The process of claim 10 wherein a source of actinic radiation is one or more LEDs emitting a wavelength of from 340 nm-415 nm.

12. A three-dimensional object formed by the process of claim 10.

13. The three-dimensional object of claim 12, wherein said three-dimensional object possesses a water absorption value of less than 1%.

14. The radiation curable composition for additive fabrication of claim 1, comprising, relative to the weight of the entire composition:
from about 40 wt % to about 90 wt % of the cationically polymerizable component comprising at least one cationically polymerizable compound;
from about 8 wt % to about 50 wt % of the radically polymerizable component comprising at least one radically polymerizable compound;
from about 1 wt % to about 8 wt % of the antimony-free cationic photoinitiator comprising at least one cationic photoinitiator;
from about 0.01 wt % to about 5 wt % of the photosensitizer comprising at least one photosensitizer;
from about 0.05 wt % to about 3 wt % of the UV absorber comprising at least one UV absorber; and
from about 0.1 wt % to about 10 wt % of the free-radical photoinitiator comprising at least one free-radical photoinitiator;
wherein the antimony-free cationic photoinitiator is substantially devoid of elemental antimony.

15. The radiation curable composition for additive fabrication of claim 14, wherein the UV absorber comprises one or more compounds selected from the group consisting of cinnamate derivatives, salicylate derivatives, benzophenone derivatives, camphor derivatives, and dibenzoyl methane derivatives, and any combinations thereof.

16. The radiation curable composition for additive fabrication of claim 14, wherein the UV absorber comprises a benzophenone derivative of the following structure:

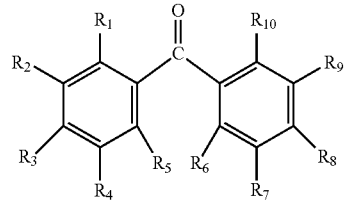

wherein $R_1$ to $R_{10}$ are the same or different, and represent a hydroxyl group, hydrogen atom or a $C_1$-$C_8$ saturated or unsaturated, branched or unbranched, substituted, or unsubstituted hydrocarbyl substituent, further wherein at least one of $R_1$, $R_5$, $R_6$, or $R_{10}$ is a hydroxyl group.

17. The radiation curable composition for additive fabrication of claim 16, wherein the UV absorber comprises 2-hydroxy-4-methoxybenzophenone, 2,4-dihydroxybenzophenone, or 2-hydroxy-4-n-octoxybenzophenone.

18. The radiation curable composition for additive fabrication of claim 14, wherein the anion of the cationic photoinitiator is a fluoroalkyl-substituted fluorophosphate.

19. The radiation curable composition for additive fabrication of claim 14, wherein the cationically polymerizable component contains an aliphatic epoxide selected from the group consisting of: 3,4-epoxycyclohexylmethyl-3',4'-epoxycyclohexanecarboxylate, 2-(3,4-epoxycyclohexyl-5,5-spiro-3,4-epoxy)-cyclohexane-1,4-dioxane, bis(3,4-epoxycyclohexylmethyl)adipate, vinylcyclohexene oxide, 4-vinylepoxycyclohexane, vinylcyclohexene dioxide, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'epoxycyclohexane carboxylates, trimethylcaprolactone-modified 3,4-epoxycyclohexylmethyl-3',4'-epoxycyclohexane carboxylates, β-methyl-δ-valerolactone-modified 3,4-epoxycyclohexcylmethyl-3',4'-epoxycyclohexane carboxylates, methylenebis(3,4-epoxycyclohexane), bicyclohexyl-3,3'-epoxide, bis(3,4-epoxycyclohexyl) with a linkage of —O—, —S—, —SO—, —SO$_2$—, —C(CH$_3$)$_2$—, —CBr$_2$—, —C(CBr$_3$)$_2$—, —C(CF$_3$)$_2$—, —(CCl$_3$)$_2$—, or —CH(C$_6$H$_5$)—, dicyclopentadiene diepoxide, di(3,4-epoxycyclohexylmethyl) ether of ethylene glycol, ethylenebis(3,4-epoxycyclohexanecarboxylate), and epoxyhexahydrodioctylphthalate.

* * * * *